United States Patent
Yamamura et al.

(10) Patent No.: US 8,247,128 B2
(45) Date of Patent: Aug. 21, 2012

(54) FUEL CELL

(75) Inventors: Hideichi Yamamura, Tokorozawa (JP); Tadashi Tsunoda, Nerima-ku (JP)

(73) Assignee: Honda Motor Co., Ltd., Tokyo (JP)

( * ) Notice: Subject to any disclaimer, the term of this patent is extended or adjusted under 35 U.S.C. 154(b) by 1056 days.

(21) Appl. No.: 12/162,947

(22) PCT Filed: Jan. 30, 2007

(86) PCT No.: PCT/JP2007/051871
§ 371 (c)(1),
(2), (4) Date: Jul. 31, 2008

(87) PCT Pub. No.: WO2007/089002
PCT Pub. Date: Aug. 9, 2007

(65) Prior Publication Data
US 2009/0169973 A1    Jul. 2, 2009

(30) Foreign Application Priority Data
Jan. 31, 2006  (JP) ................................ 2006-023019

(51) Int. Cl.
*H01M 2/38* (2006.01)

(52) U.S. Cl. ........ 429/456; 429/458; 429/460; 429/466; 429/469; 429/471; 429/508

(58) Field of Classification Search .................. 429/452, 429/456, 458, 460, 463, 466, 467, 508, 509, 429/469–471
See application file for complete search history.

(56) References Cited

U.S. PATENT DOCUMENTS

| | | | |
|---|---|---|---|
| 6,344,290 B1 | 2/2002 | Bossel et al. | |
| 2002/0055032 A1 | 5/2002 | Wakahoi et al. | |
| 2003/0118889 A1* | 6/2003 | Smith | 429/36 |
| 2004/0115512 A1 | 6/2004 | Fujii et al. | |
| 2004/0197630 A1* | 10/2004 | Wilson et al. | 429/32 |
| 2004/0234837 A1 | 11/2004 | Dan | |
| 2005/0142424 A1 | 6/2005 | Homma et al. | |

FOREIGN PATENT DOCUMENTS

| | | |
|---|---|---|
| JP | 7-326373 | 12/1995 |
| JP | 2005-85520 | 3/2005 |
| JP | 2005-85521 | 3/2005 |
| WO | WO-98/35398 A1 | 8/1998 |

OTHER PUBLICATIONS

Korean Office Action for Application No. 10-2008-7018805, dated Jul. 29, 2010.
International Search Report for Application No. PCT/JP2007/051871, dated Jul. 12, 2007.

\* cited by examiner

*Primary Examiner* — Patrick Ryan
*Assistant Examiner* — Ben Lewis
(74) *Attorney, Agent, or Firm* — Nelson Mullins Riley & Scarborough LLP; Anthony A. Laurentano

(57) ABSTRACT

A fuel cell includes electrolyte electrode assembly and separators. An annular member and a ring foil are provided between the separators. The annular member is provided around an outer circumferential portion of the electrolyte electrode assembly, and includes grooves for discharging a first exhaust gas FGoff which has been consumed at an anode to the outside of the electrolyte electrode assembly. The ring foil is provided adjacent to a cathode, and extends from a position between an outer end of the electrolyte electrode assembly to a position between the annular member and the separator.

23 Claims, 22 Drawing Sheets

FIG. 2
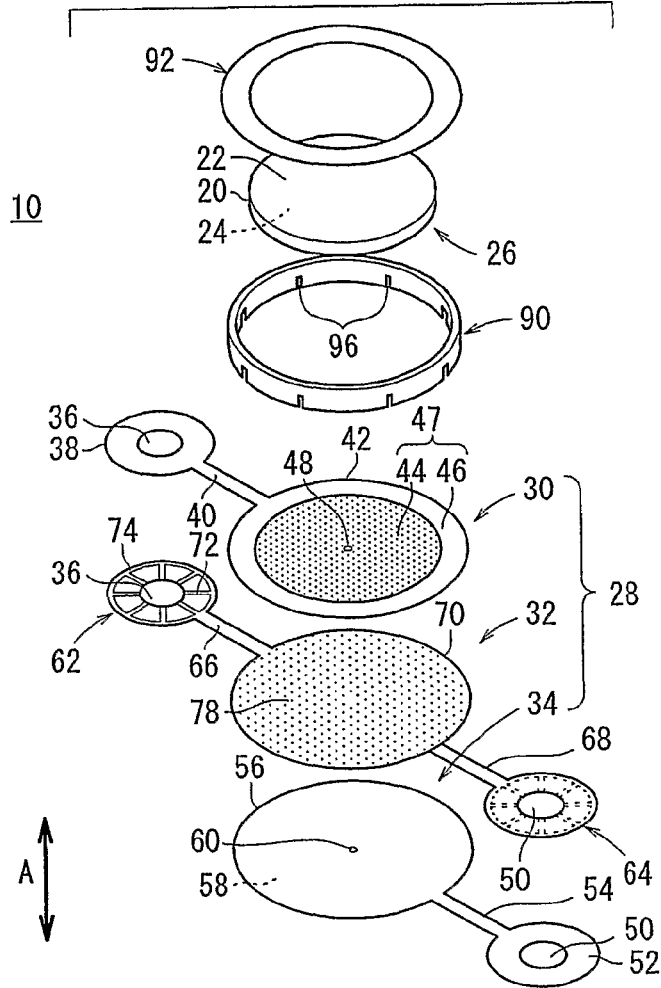
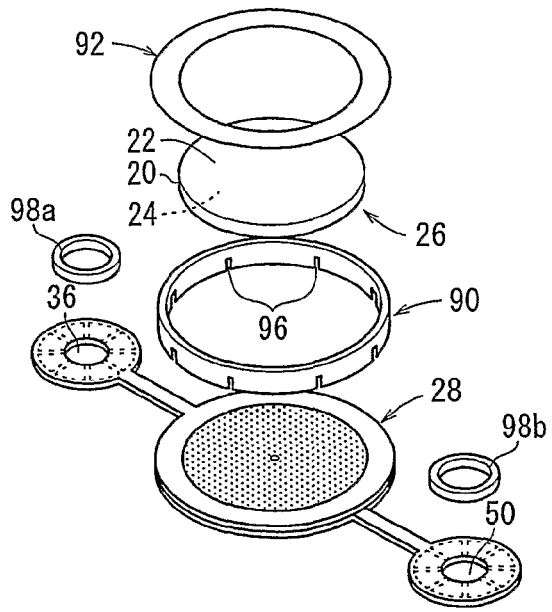

FUEL CELL

RELATED APPLICATIONS

This application is a 35 U.S.C. 371 national stage filing of International Application No. PCT/JP2007/051871, filed 30 Jan. 2007, which claims priority to Japanese Patent Application No. 2006-023019 filed on 31 Jan. 2006 in Japan. The contents of the aforementioned applications are hereby incorporated by reference.

TECHNICAL FIELD

The present invention relates to a fuel cell formed by stacking an electrolyte electrode assembly and separators. The electrolyte electrode assembly includes an anode, a cathode, and an electrolyte interposed between the anode and the cathode.

BACKGROUND ART

Typically, a solid oxide fuel cell (SOFC) employs an electrolyte of ion-conductive solid oxide such as stabilized zirconia. The electrolyte is interposed between an anode and a cathode to form an electrolyte electrode assembly. The electrolyte electrode assembly is interposed between separators (bipolar plates). In practical use, predetermined numbers of the electrolyte electrode assemblies and the separators are stacked together to form a fuel cell stack.

In the fuel cell, sealless structure is often adopted. In the sealless structure, a fuel gas such as a hydrogen gas is supplied to the anode, and an oxygen-containing gas such as the air is supplied to the cathode. The remaining fuel gas after consumption in the power generation reaction (off gas) and the oxygen-containing gas are discharged to the outside from the outer circumferential portion of the fuel cell. At this time, in the air discharged to the outside of the fuel cell, back diffusion to the anode may occur. Consequently, the backwardly diffused air and the fuel gas supplied to the anode may cause combustion reaction undesirably.

In this regard, for example, a solid oxide fuel cell disclosed in Japanese Laid-Open Patent Publication No. 2005-85521 is known. As shown in FIG. 22, the fuel cell comprises a power generation cell 1 including a solid electrolyte layer 1$a$, and a fuel electrode layer 1$b$ and an oxidizing gas electrode layer 1$c$ on both surfaces of the solid electrolyte layer 1$a$. Further, a fuel electrode current collector 2 and an oxidizing gas electrode current collector 3 are provided for the power generation cell 1, and separators 4 are provided outside the fuel electrode current collector 2 and the oxidizing gas electrode current collector 3 to form the fuel cell having sealless structure. An insulating cover 5 having a gas discharge hole 5$a$ is provided to cover the outer circumferential portion of the fuel electrode layer 1$b$ and the fuel electrode current collector 2.

According to the disclosure, since the insulating cover 5 covers the outer circumferential surface of the fuel electrode current collector 2, the off gas is discharged through only the gas discharge hole 5$a$ from the outer circumferential portion of the fuel electrode current collector 2, and it is possible to suppress the amount of the discharged fuel gas which does not contribute to the power generation reaction.

However, in the conventional technique, the fuel gas discharged from the outer circumferential portion of the fuel electrode current collector 2 and the oxygen-containing gas discharged from the outer circumferential portion of the oxidizing gas electrode current collector 3 easily contact in an area near the outer circumferential portion of the power generation cell 1. Therefore, the fuel gas and the oxygen-containing gas are combusted near the outer circumferential portion of the power generation cell 1, and local heat increase or the like occurs. Consequently, the power generation cell 1 may be damaged undesirably. Further, the insulating cover 5 is made of material which is heterogeneous to material of the power generation cell 1 or material of the oxidizing gas electrode current collector 3. Thus, because of the difference of the linear coefficient of expansion, the contact resistance increases due to cracks or contact failure. As a result, the power generation efficiency and the durability may be degraded disadvantageously.

DISCLOSURE OF INVENTION

The present invention has been made to solve the above problems, and an object of the present invention is to provide a fuel cell in which the fuel gas and oxygen-containing gas which have been consumed in the reaction do not contact each other in an area near an electrolyte electrode assembly, and it is possible to reliably prevent the power generation efficiency and the durability from being degraded due to combustion of the exhaust gas.

The present invention relates to a fuel cell formed by stacking an electrolyte electrode assembly and separators. The electrolyte electrode assembly includes an anode, a cathode, and an electrolyte interposed between the anode and the cathode. The fuel cell comprises a seal member extending from a position between an outer end of the electrolyte electrode assembly and the separator to an outer circumference of the separator. The seal member prevents a first exhaust gas which has been consumed at one electrode of the anode and the cathode from entering the other electrode of the anode and the cathode, and allows a second exhaust gas which has been consumed at the other electrode to be discharged to the outside of the electrolyte electrode assembly.

Preferably, the seal member is provided adjacent to the other electrode, and an annular member has an opening for discharging the first exhaust gas which has been consumed at the one electrode to the outside of the electrolyte electrode assembly and is provided between the separators.

Further, according to another aspect of the present invention, the fuel cell comprises an annular member provided between the separators around an outer circumferential portion of the electrolyte electrode assembly. The annular member has an opening for discharging a first exhaust gas which has been consumed at one electrode of the anode and the cathode to the outside of the electrolyte electrode assembly. A seal member is provided adjacent to the other electrode of the anode and the cathode. The seal member extends from a position between an outer end of the electrolyte electrode assembly and the separator to a position between the annular member and the separator. The seal member prevents the first exhaust gas from entering the other electrode, and allows a second exhaust gas which has been consumed at the other electrode to be discharged to the outside of the electrolyte electrode assembly.

Further, preferably, the separator comprises a fuel gas channel for supplying the fuel gas from a central region to an outer circumferential region on a surface of the anode, and an oxygen-containing gas channel for supplying an oxygen-containing gas from a central region to an outer circumferential region on a surface of the cathode. In the structure, the fuel gas and the oxygen-containing gas flow uniformly. Thus, the uniform power generation reaction is achieved, occurrence of heat distortion is reduced, and improvement of fuel gas utilization ratio is achieved.

Further, preferably, the separator comprises first, second, and third plates which are stacked together, and the fuel gas channel is formed between the first plate and the anode, and the oxygen-containing gas channel is formed between the third plate and the cathode.

Further, preferably, a fuel gas pressure chamber which can be filled with the fuel gas under pressure, and a fuel gas inlet connecting the fuel gas pressure chamber and the fuel gas channel at a position corresponding to the central region of a surface of the anode are formed between the first plate and the second plate, and an oxygen-containing gas pressure chamber which can be filled with the oxygen-containing gas under pressure, and an oxygen-containing gas inlet connecting the oxygen-containing gas pressure chamber and the oxygen-containing gas channel at a position corresponding to the central region of a surface of the cathode are formed between the second plate and the third plate.

Further, preferably, the annular member is spaced from an outer circumferential surface of the electrolyte electrode assembly, and provided around the electrolyte electrode assembly to form a chamber where the first exhaust gas can be retained between an inner surface of the annular member and the outer surface of the electrolyte electrode assembly. In the structure, the annular member does not directly contact the electrolyte electrode assembly, so that it is possible to prevent deformation or damages due to the thermal expansion difference between the annular member and the electrolyte electrode assembly. Further, it is possible to maintain the pressure of the first exhaust gas in the chamber at a level higher than that of the outside pressure. Further, back diffusion of the outside atmospheric air into the chamber is prevented.

Further, preferably, the annular member is an insulating member. Further, preferably, the insulating member is an insulator, a metal member including an insulating layer, or a composite member of insulator and metal. Further, preferably, insulator is interposed between the annular member and the separator, or between the annular members. In the simple structure, it is possible to prevent the short circuit between the anode and the cathode.

Further, preferably, the seal member is a metal foil ring member. In the structure, the seal member is positioned by receiving the load applied to the fuel cell by the annular member. By applying the load to the seal member, the seal member tightly contacts the electrolyte electrode assembly, the separator, and the annular member. Thus, improvement in the sealing performance and current collecting performance is achieved.

Further, preferably, an insulating layer is provided in part of the metal foil ring member. Further, preferably, the insulating layer contacts any one of the electrolyte, the anode, and the cathode.

After the fuel gas is supplied to the anode for power generation reaction, when the fuel gas is discharged from the anode as an exhaust gas, the exhaust gas contains the unreacted gas. The exhaust gas containing the unreacted gas is referred to as the off gas.

According to the present invention, the first exhaust gas after consumption at one electrode is prevented from flowing into the other electrode, and the second exhaust gas after consumption at the other electrode is discharged to the outside of the electrolyte electrode assembly without contacting the first exhaust gas.

Further, according to the present invention, the first exhaust gas after consumption at one electrode is discharged to the outside of the electrolyte electrode assembly through the opening of the annular member, and the second exhaust gas after consumption at the other electrode is discharged to the outside of the electrolyte electrode assembly without contacting the first exhaust gas through the seal member.

Thus, combustion of the first and second exhaust gases in an area near the electrolyte electrode assembly is reliably prevented, and it is possible to suitably improve the power generation efficiency and the durability of the electrolyte electrode assembly.

BRIEF DESCRIPTION OF DRAWINGS

FIG. 2 is an exploded perspective view showing the fuel cell;

BEST MODE FOR CARRYING OUT THE INVENTION

Figure 1:
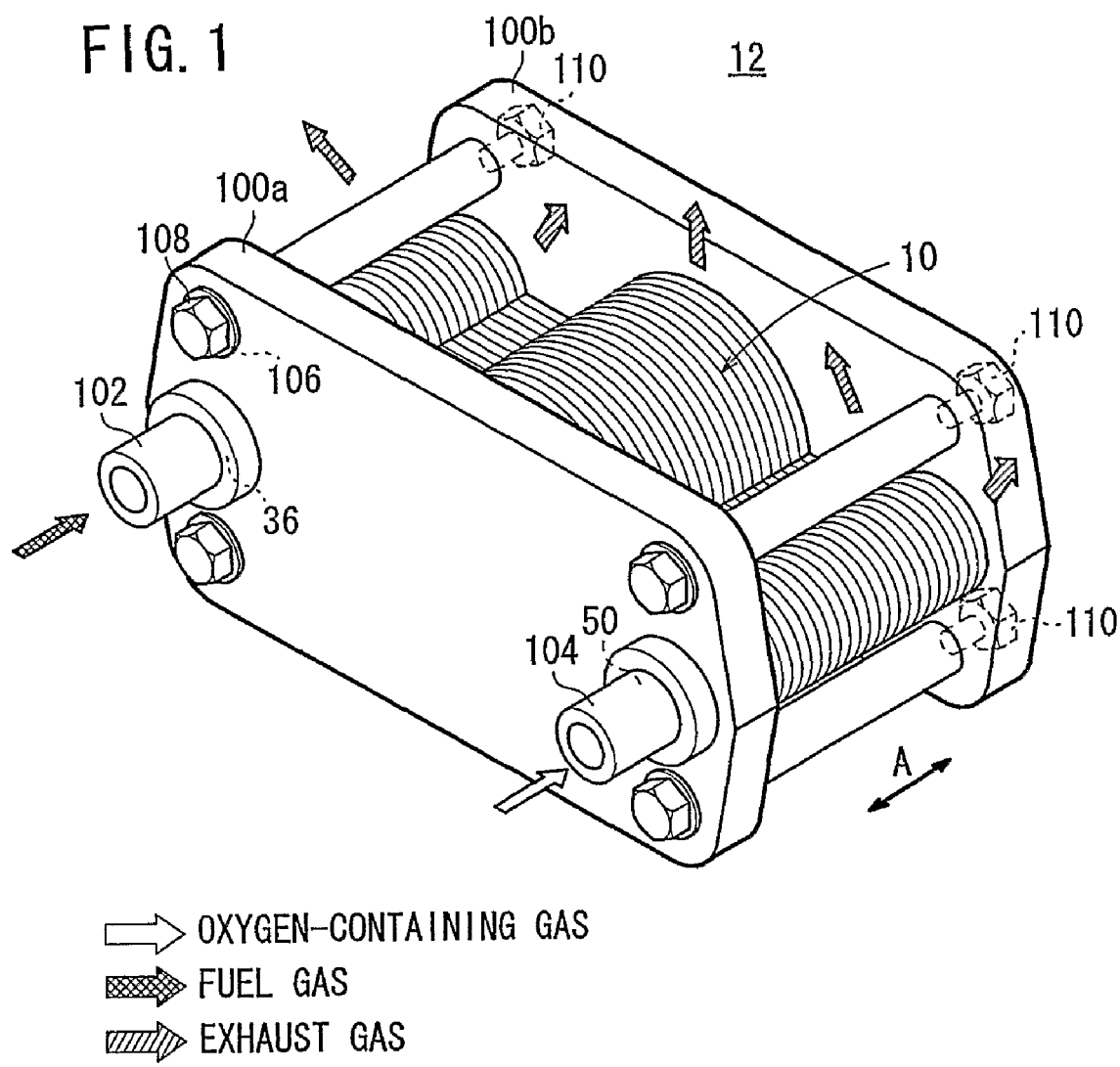
FIG. 1 is a perspective view schematically showing a fuel cell stack formed by stacking fuel cells according to a first embodiment of the present invention.

FIG. 1 is a perspective view schematically showing a fuel cell stack 12 formed by stacking a plurality of fuel cells 10 according to a first embodiment of the present invention in a direction indicated by an arrow A.

Figure 3:
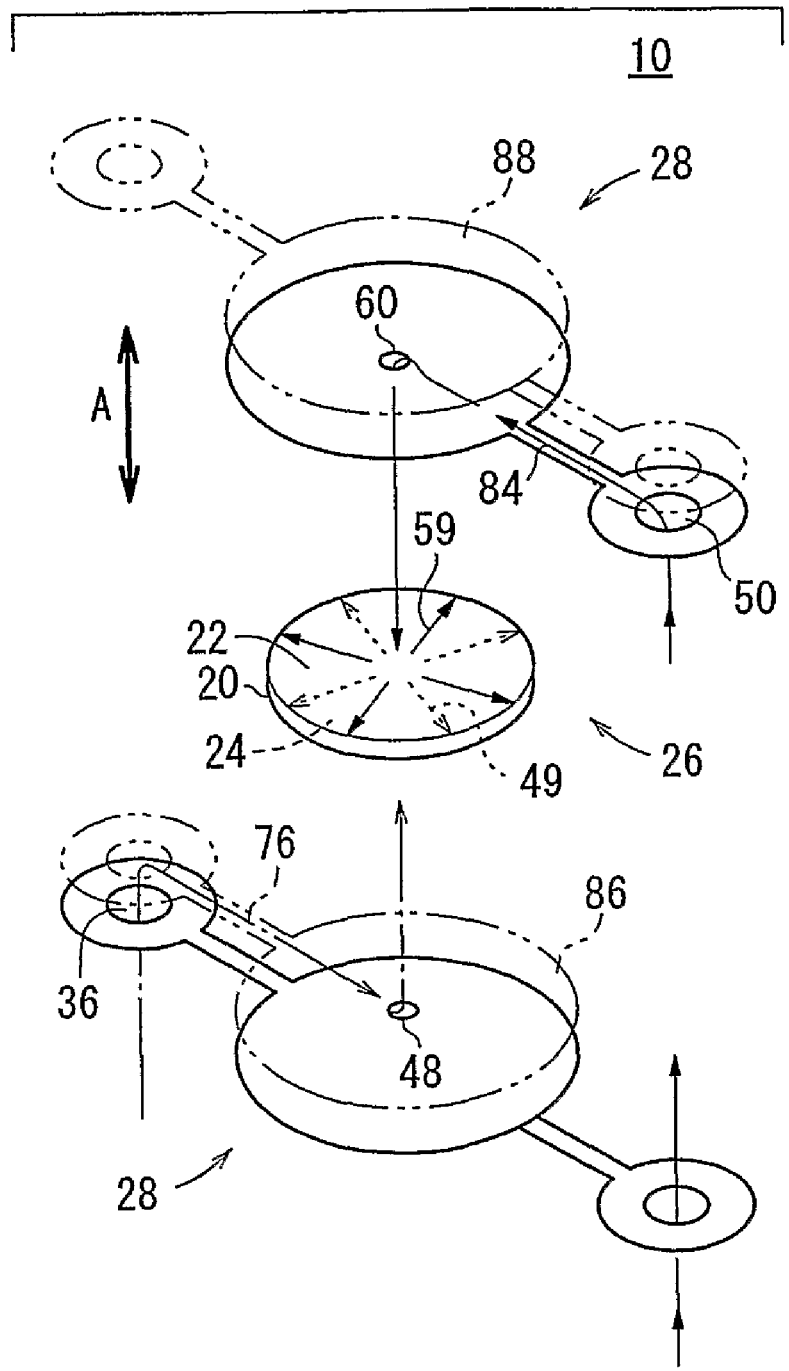
FIG. 3 is a partial exploded perspective view showing gas flows in the fuel cell.

The fuel cell 10 is a solid oxide fuel cell (SOFC) used in various applications, including stationary and mobile applications. For example, the fuel cell 10 is mounted on a vehicle. As shown in FIGS. 2 and 3, the fuel cell 10 includes an electrolyte electrode assembly 26. The electrolyte electrode assembly 26 includes a cathode 22, an anode 24, and an electrolyte (electrolyte plate) 20 interposed between the cathode 22 and the anode 24. For example, the electrolyte 20 is made of ion-conductive solid oxide such as stabilized zirconia. The electrolyte electrode assembly 26 has a circular disk shape. Densification treatment is applied to the outer circumferential surface of the cathode 22 to prevent the leakage of an oxygen-containing gas.

The fuel cell 10 is formed by sandwiching the electrolyte electrode assembly 26 between a pair of separators 28. Each of the separators 28 includes first, second, and third plates 30, 32, 34. For example, the first to third plates 30, 32, 34 are metal plates of, e.g., stainless alloy. The first plate 30 and the third plate 34 are joined to both surfaces of the second plate 32 by brazing, for example (see FIGS. 2 and 4).

As shown in FIG. 2, the first plate 30 has a first small diameter end portion 38. A fuel gas supply passage 36 for supplying a fuel gas in the direction indicated by the arrow A extends through the first small diameter end portion 38. The first small diameter end portion 38 is integral with a first circular disk 42 having a relatively large diameter through a narrow bridge 40. The diameter of the first circular disk 42 is larger than the diameter of the anode 24 of the electrolyte electrode assembly 26 by a predetermined dimension.

Figure 5:
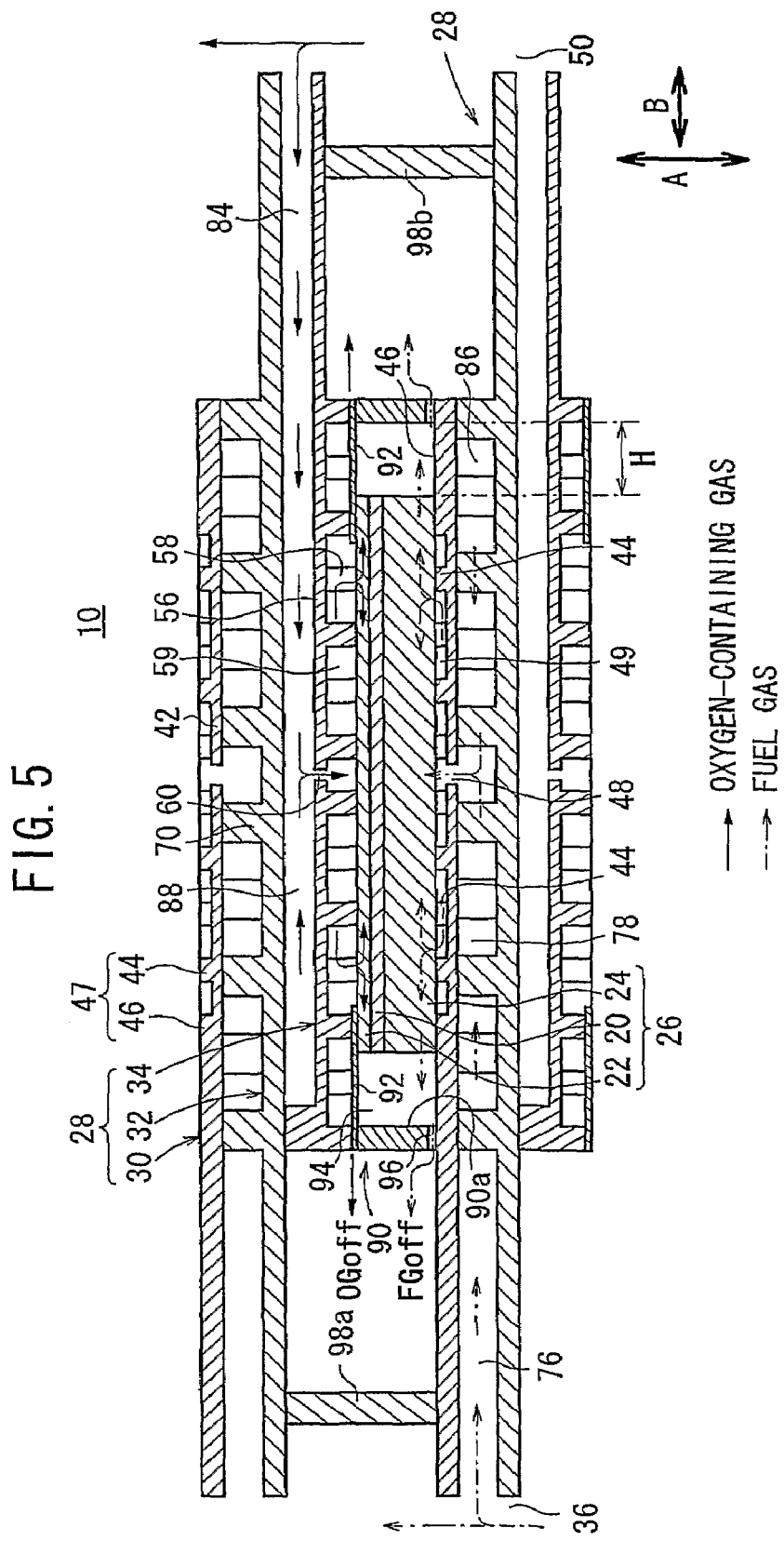
FIG. 5 is a cross-sectional view schematically showing operation of the fuel cell.

A large number of protrusions 44 are formed on a surface of the first circular disk 42 which contacts the anode 24, in a central region adjacent to an outer circumferential region. A substantially ring shaped protrusion 46 is provided on the outer circumferential region of the first circular disk 42 such that the substantially ring shaped protrusion 46 surrounds the protrusions 44. The protrusions 44 and the substantially ring shaped protrusion 46 are first protrusions 47 that jointly function as a current collector. As shown in FIG. 5, the protrusions 44 and the ring shaped protrusion 46 protrude toward the anode (one electrode) 24 to form a fuel gas channel 49 as a passage of the fuel gas among the protrusions 44, the ring shaped protrusion 46, and the anode 24.

A fuel gas inlet 48 is provided at the center of the first circular disk 42 for supplying the fuel gas toward substantially the central region of the anode 24. The protrusions 44 may be formed by making a plurality of recesses in a surface which is in the same plane with the surface of the substantially ring shaped protrusion 46.

As shown in FIG. 2, the third plate 34 has a second small diameter end portion 52. An oxygen-containing gas supply passage 50 for supplying the oxygen-containing gas in the direction indicated by the arrow A extends through the second small diameter end portion 52. The second small diameter end portion 52 is integral with a second circular disk 56 having a relatively large diameter through a narrow bridge 54. The diameter of the second circular disk 56 is larger than the cathode 22 by a predetermined dimension.

A plurality of second protrusions 58 are formed on the entire surface of the second circular disk 56 which contacts the cathode 22 of the electrolyte electrode assembly 26. The second protrusions 58 function as a current collector. As shown in FIG. 5, the second protrusions 58 protrude toward the cathode (the other electrode) 22 to form the oxygen-containing gas channel 59 between the second protrusions 58 and the cathode 22. An oxygen-containing gas inlet 60 is provided at the center of the second circular disk 56 for supplying the oxygen-containing gas toward substantially the central region of the cathode 22.

As shown in FIG. 2, the second plate 32 includes a third small diameter end portion 62 and a fourth small diameter end portion 64. The fuel gas supply passage 36 extends through the third small diameter end portion 62, and the oxygen-containing gas supply passage 50 extends through the fourth small diameter end portion 64. The third and fourth small diameter end portions 62, 64 are integral with a third circular disk 70 having a relatively large diameter through narrow bridges 66, 68, respectively. The first to third circular disks 42, 56, 70 have the same diameter.

The second plate 32 has a plurality of slits 72 radially formed in the third small diameter end portion 62, on a surface facing the first plate 30. The slits 72 are connected to the fuel gas supply passage 36. Further, the slits 72 are connected to a recess 74 formed along an outer circumferential region of the third small diameter end portion 62. The recess 74 prevents the entry of brazing material into the slits 72, and into an area inside the recess 74. A fuel gas supply channel 76 is formed in the bridge 66 and in the surface of the third circular disk 70 (see FIGS. 2 though 5). The fuel gas flows from the fuel gas supply passage 36 to the fuel gas supply channel 76 through the slits 72. A plurality of third protrusions 78 are formed on the third circular disk 70, and the third protrusions 78 are part of the fuel gas supply channel 76.

Figure 4:
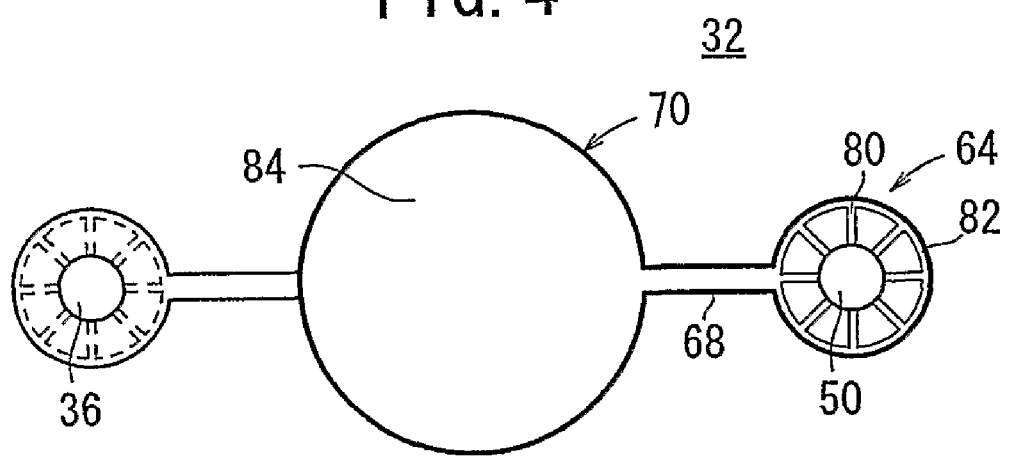
FIG. 4 is a front view showing a second plate of the fuel cell.

As shown in FIG. 4, the second plate 32 has a plurality of slits 80 radially formed in the fourth small diameter end portion 64, on a surface which contacts the third plate 34. The slits 80 are connected to the oxygen-containing gas supply passage 50. Further, the slits 80 are connected to a recess 82. The recess 82 prevents the entry of brazing material into slits 80, and into an area inside the recess 82. An oxygen-containing gas supply channel 84 is formed in the third circular disk 70. The oxygen-containing gas flows from the oxygen-containing gas supply passage 50 through the slits 80 into the third circular disk 70. The oxygen-containing gas supply channel 84 is closed by the outer circumferential region of the third circular disk 70.

The first plate 30 is joined to one surface of the second plate 32 by brazing to form the fuel gas supply channel 76 connected to the fuel gas supply passage 36 between the first and second plates 30, 32.

The fuel gas supply channel 76 is provided between the first and third circular disks 42, 70, over the electrode surface of the anode 24. The first circular disk 42 is provided between the fuel gas supply channel 76 and the anode 24. That is, a fuel gas pressure chamber 86 is formed such that the first circular disk 42 tightly contacts the anode 24 under pressure when the fuel gas is supplied to the fuel gas supply channel 76 (see FIG. 5). The fuel gas pressure chamber 86 is connected to the fuel gas channel 49 through the fuel gas inlet 48.

The second plate 32 is joined to the third plate 34 by brazing to form the oxygen-containing gas supply channel 84 connected to the oxygen-containing gas supply passage 50 between the second and third plates 32, 34 (see FIG. 5).

The oxygen-containing gas supply channel 84 is provided between the second and third circular disks 56, 70, over the electrode surface of the cathode 22. The second circular disk 56 is provided between the oxygen-containing gas supply channel 84 and the cathode 22. That is, an oxygen-containing gas pressure chamber 88 is formed such that the second circular disk 56 tightly contacts the cathode 22 under pressure when the oxygen-containing gas is supplied to the oxygen-containing gas supply channel 84. The oxygen-containing gas pressure chamber 88 is connected to the oxygen-containing gas channel 59 through the oxygen-containing gas inlet 60.

As shown in FIGS. 2 and 5, a ring shaped annular member 90 and a ring foil (seal member) 92 are provided between a pair of the separators 28. The annular member 90 is provided around the outer circumferential portion of the electrolyte electrode assembly 26. The ring foil 92 extends from a position between the outer end of the electrolyte electrode assembly 26 and the separator 28 to a position between the annular member 90 and the separator 28.

The annular member 90 is formed by embedding insulator in metal such as alumina material, nickel material, stainless material or the like, or providing insulating coating of ceramic or the like on the metal. A ring shaped chamber 94 having a predetermined dimension H is formed between an inner surface 90a of the annular member 90 and the outer surface of the electrolyte electrode assembly 26. The fuel gas after consumption (first exhaust gas) at the anode 24 can be retained in the chamber 94. A plurality of grooves (openings) 96 are formed at predetermined intervals for discharging the first exhaust gas from the chamber 94 to the outside of the fuel cell 10.

As the materials of the ring foil 92, nickel, stainless steel, and noble metals such as platinum can be used. The inner end of the ring foil 92 contacts the outer end of the cathode 22 of the electrolyte electrode assembly 26 and the outer end of the ring foil 92 contacts the annular member 90. The annular member 90 has rigid structure, and the ring foil 92 has flexible structure.

The metal foil used as the ring foil 92 may include an insulating layer. The insulating layer may comprise a foil member made of insulator similar to the ring foil 92, or formed by directly coating insulator on the metal foil. The insulating layer contacts the electrolyte 20 or the outer end of the cathode 22.

Figure 6:
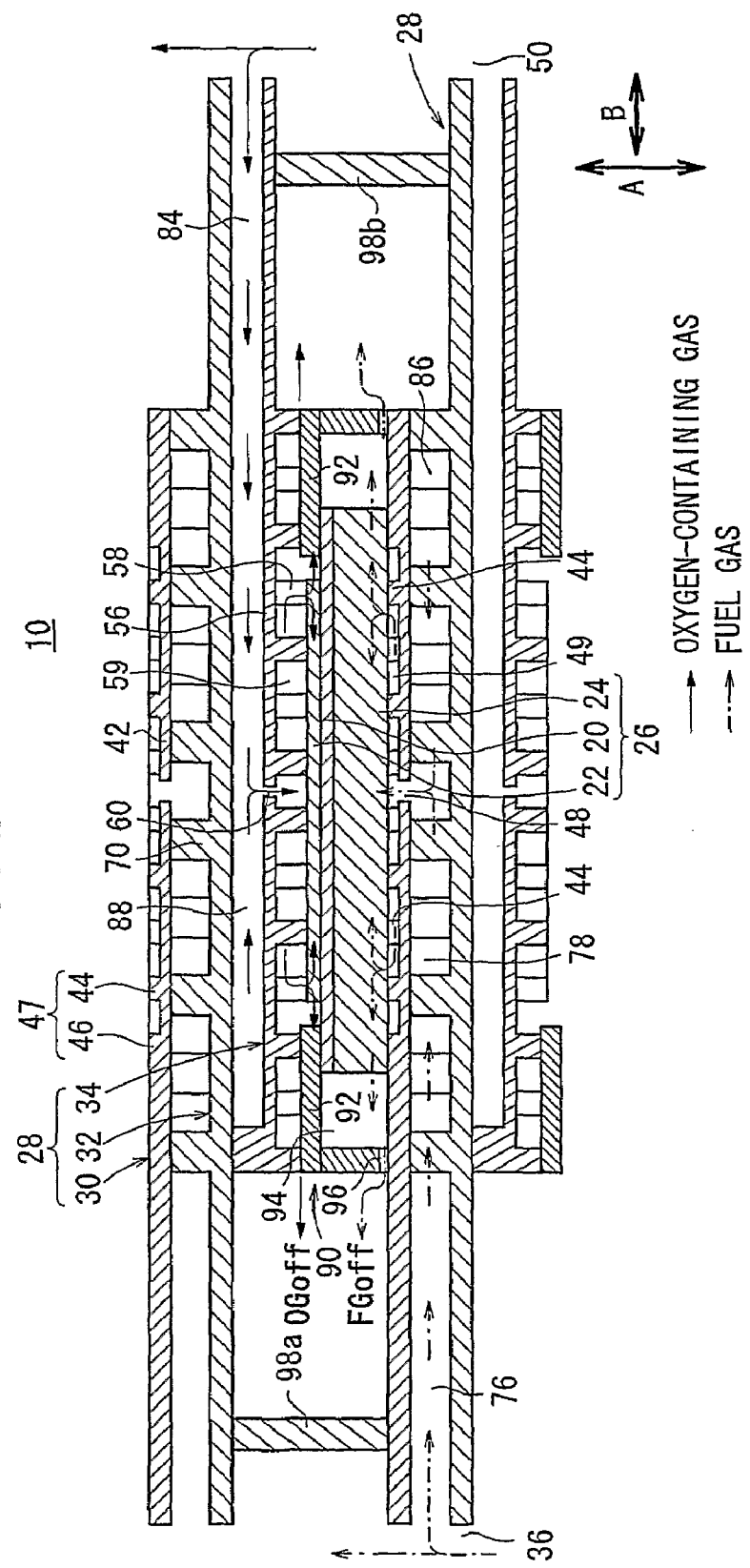
FIG. 6 is a cross-sectional view showing a fuel cell including an electrolyte electrode assembly having different structure.

As shown in FIG. 5, the electrolyte electrode assembly 26 employs an anode support cell (ASC) in which the thickness of the anode 24 is significantly larger than the thickness of the electrolyte 20 and the thickness of the cathode 22. Densification treatment is applied to the outer circumferential surface of the cathode 22 to prevent the leakage of the oxygen-containing gas. As shown in FIG. 6, alternatively, the diameter of the cathode 22 may be smaller than the diameter of the electrolyte 20. In the structure, the ring foil 92 directly contacts the outer end of the electrolyte 20.

Insulating seals 98a for sealing the fuel gas supply passage 36 and insulating seals 98b for sealing the oxygen-containing gas supply passage 50 are provided between the separators 28 (see FIGS. 2 and 5). For example, the insulating seals 98a, 98b are made of mica material, or ceramic material.

As shown in FIG. 1, the fuel cell stack 12 includes a plurality of fuel cells 10 stacked together, and end plates 100a, 100b provided at opposite ends in the stacking direction. The end plate 100a or the end plate 100b is electrically insulated from tightening bolts 108. A first pipe 102 and a second pipe 104 extend through the end plate 100a. The first pipe 102 is connected to the fuel gas supply passage 36, and the second pipe 104 is connected to the oxygen-containing gas supply passage 50. The end plates 100a, 100b have bolt holes 106 at positions above and under the fuel gas supply passage 36, and at positions above and under the oxygen-containing gas supply passage 50. Tightening bolts 108 are inserted into the respective bolt holes 106, and tip ends of the respective tightening bolts 108 are screwed into nuts 110 for tightening the fuel cell stack 12.

Next, operation of the fuel cell stack 12 will be described below.

As shown in FIG. 2, in assembling the fuel cell 10, firstly, the first plate 30 of the separator 28 is joined to one surface of the second plate 32, and the third plate 34 is joined to the other surface of the second plate 32. Thus, the second plate 32 divides a space in the separator 28 to form the fuel gas supply channel 76 connected to the fuel gas supply passage 36 and the oxygen-containing gas supply channel 84 connected to the oxygen-containing gas supply passage 50 separately (see FIG. 3).

Further, the fuel gas pressure chamber 86 is formed between the first and third circular disks 42, 70, and the oxygen-containing gas pressure chamber 88 is formed between the second and third circular disks 56, 70 (see FIG. 5).

Then, the separators 28 and the electrolyte electrode assemblies 26 are stacked alternately, and the annular member 90 is provided on the first circular disk 42 of the separator 28. The ring foil 92 is placed on the annular member 90 and the outer end of the cathode 22 of the electrolyte electrode assembly 26 (or the outer end of the electrolyte 20 shown in FIG. 6).

Then, a predetermined number of fuel cells 10 are stacked together, and the end plates 100a, 100b are provided at the opposite ends in the stacking direction. The tightening bolts 108 are inserted into the respective bolt holes 106 of the end plates 100a, 100b, and the tip ends of the tightening bolts 108 are screwed into the nuts 110 to form the fuel cell stack 12 (see FIG. 1).

In the first embodiment, as shown in FIG. 5, the annular member 90 and the ring foil 92 are provided between the separators 28, and the ring foil 92 extends from the position between the outer end of the electrolyte electrode assembly 26 and the separator 28 to the position between the annular member 90 and the separator 28.

In the structure, when a stacking load is applied to the fuel cell stack 12 through the tightening bolts 108, firstly, almost all of the tightening load is transmitted to the annular member 90 having rigid structure. Therefore, the components between the separators 28 can be positioned suitably, and the desired sealing performance between the separators 28 is maintained.

Further, since the ring foil 92 has flexible structure, the ring foil 92 is deformable under pressure by a relatively small load. That is, by applying a further slight tightening load to the ring foil 92, the ring foil 92 is tightly interposed between the electrolyte electrode assembly 26 and the separator 28, and the annular member 90 and the separator 28, and the desired tightening performance is achieved.

In FIG. 1, the fuel gas (e.g., hydrogen-containing gas) is supplied to the first pipe 102 connected to the end plate 100a, and flows from the first pipe 102 to the fuel gas supply passage 36. The oxygen-containing gas (hereinafter also referred to as the "air") is supplied to the second pipe 104 connected to the end plate 100a, and the oxygen-containing gas flows from the second pipe 104 to the oxygen-containing gas supply passage 50.

As shown in FIG. 5, after the fuel gas flows into the fuel gas supply passage 36, the fuel gas flows in the stacking direction indicated by the arrow A, and is supplied to the fuel gas supply channel 76 in the separator 28 of each of the fuel cells 10. The fuel gas flows along the fuel gas supply channel 76, and flows into the fuel gas pressure chamber 86 between the first and third circular disks 42, 70. The fuel gas flows between the third protrusions 78, and flows into the fuel gas inlet 48 at the central position of the first circular disk 42.

The fuel gas inlet 48 is provided at a position corresponding to the central position of the anode 24 in each of the electrolyte electrode assemblies 26. Therefore, the fuel gas from the fuel gas inlet 48 is supplied to the fuel gas channel 49, and flows from the central region of the anode 24 toward the outer circumferential region of the anode 24.

After the oxygen-containing gas flows into the oxygen-containing gas supply passage 50, the oxygen-containing gas flows through the oxygen-containing gas supply channel 84 in the separator 28, and is supplied to the oxygen-containing gas pressure chamber 88 between the second and third circular disks 56, 70. The oxygen-containing gas flows into the oxygen-containing gas inlet 60 at the central position of the second circular disk 56.

The oxygen-containing gas inlet 60 is provided at a position corresponding to the central position of the cathode 22 in each of the electrolyte electrode assemblies 26. Therefore, the oxygen-containing gas from the oxygen-containing gas inlet 60 is supplied to the oxygen-containing gas channel 59, and flows from the central region of the cathode 22 to the outer circumferential region of the cathode 22.

Thus, in each of the electrolyte electrode assemblies 26, the fuel gas is supplied from the central region of the anode 24 to the outer circumferential region of the anode 24, and the oxygen-containing gas is supplied from the central region of the cathode 22 to the outer circumferential region of the cathode 22 for generating electricity. The fuel gas consumed in power generation is discharged as the off gas (hereinafter referred to as the "first exhaust gas FGoff") and the oxygen-containing gas consumed in power generation (hereinafter referred to as the "second exhaust gas OGoff") are discharged from the outer circumferential portions of the first to third circular disks 42, 56, 70.

In the first embodiment, as shown in FIG. 5, the chamber 94 is formed between the outer circumference of the electrolyte electrode assembly 26 and the inner surface 90a of the annular member 90. The first exhaust gas FGoff discharged from the anode 24 of the electrolyte electrode assembly 26 is temporarily retained in the chamber 94.

The second exhaust gas OGoff discharged from the cathode 22 of the electrolyte electrode assembly 26 flows through a space between the ring foil 92 which tightly contacts the outer end of the electrolyte electrode assembly 26 and the second circular disk 56 of the separator 28 to the outside of the fuel cell stack 12. Further, the first exhaust gas FGoff in the chamber 94 flows through the grooves 96 formed in the annular member 90 to the outside of the fuel cell stack 12.

In the structure, the first exhaust gas FGoff discharged from the anode 24 flows from the chamber 94 through the grooves 96 of the annular member 90 to the outside of the electrolyte electrode assembly 26 and the second exhaust gas OGoff discharged from the cathode 22 is discharged to the outside of the electrolyte electrode assembly 26 without contacting the first exhaust gas FGoff through the ring foil 92.

Thus, in the area near the electrolyte electrode assembly 26, it is possible to reliably prevent combustion of the first exhaust gas FGoff and the second exhaust gas OGoff, and improve the power generation efficiency and the durability of the electrolyte electrode assembly 26 suitably.

Further, the annular member 90 and the ring foil 92 are electrically insulated from each other. Thus, it is possible to effectively prevent the short circuit between the anode 24 and the cathode 22.

Further, the separator 28 has the fuel gas channel 49 for supplying the fuel gas from the central region to the outer circumferential region on the surface of the anode 24, and the oxygen-containing gas channel 59 for supplying the oxygen-containing gas from the central region to the outer circumferential region on the surface of the cathode 22. Therefore, the fuel gas and the oxygen-containing gas flow uniformly. As a result, the uniform power generation reaction is achieved, heat distortion is reduced, and the fuel gas utilization ratio is improved advantageously.

Further, the fuel gas pressure chamber 86 and the oxygen-containing gas pressure chamber 88 are provided in the separator 28. When the fuel gas is supplied into the fuel gas pressure chamber 86, the first circular disk 42 presses the anode 24 under pressure. Further, when the oxygen-containing gas is supplied into the oxygen-containing gas pressure chamber 88, the second circular disk 56 presses the cathode 22 under pressure. Therefore, when the fuel gas and the oxygen-containing gas flow into the fuel gas pressure chamber 86 and the oxygen-containing gas pressure chamber 88, respectively, under pressure, the load applied to the ring foil 92 is increased, and improvement in the sealing performance by the ring foil 92 is achieved. Thus, the first exhaust gas FGoff and the second exhaust gas OGoff are separated suitably.

Further, since the annular member 90 receives almost all of the tightening load applied to the fuel cell stack 12 in the stacking direction, the load applied to the electrolyte electrode assembly 26 is reduced. Accordingly, even if a large tightening load is applied to the fuel cell stack 12, the electrolyte electrode assembly 26 is not damaged, so that improvement in the operating performance is achieved, and improvement in the sealing performance is achieved easily.

Further, in the first embodiment, the annular member 90 is spaced away from the outer circumferential surface of the electrolyte electrode assembly 26 to form the chamber 94 between the outer circumferential surface of the electrolyte electrode assembly 26 and the inner surface 90a of the annular member 90. Thus, the annular member 90 does not directly contact the electrolyte electrode assembly 26, and it is possible to avoid deformation or damages due to the thermal expansion difference between the annular member 90 and the electrolyte electrode assembly 26.

Further, the pressure of the first exhaust gas FGoff temporarily retained in the chamber 94 is kept at a high level in comparison with the external pressure. Therefore, the first exhaust gas FGoff is discharged uniformly from the grooves 96 of the annular member 90 to the outside, and it is possible to prevent the backflow of the outside atmospheric air into the chamber 94.

Figure 7:
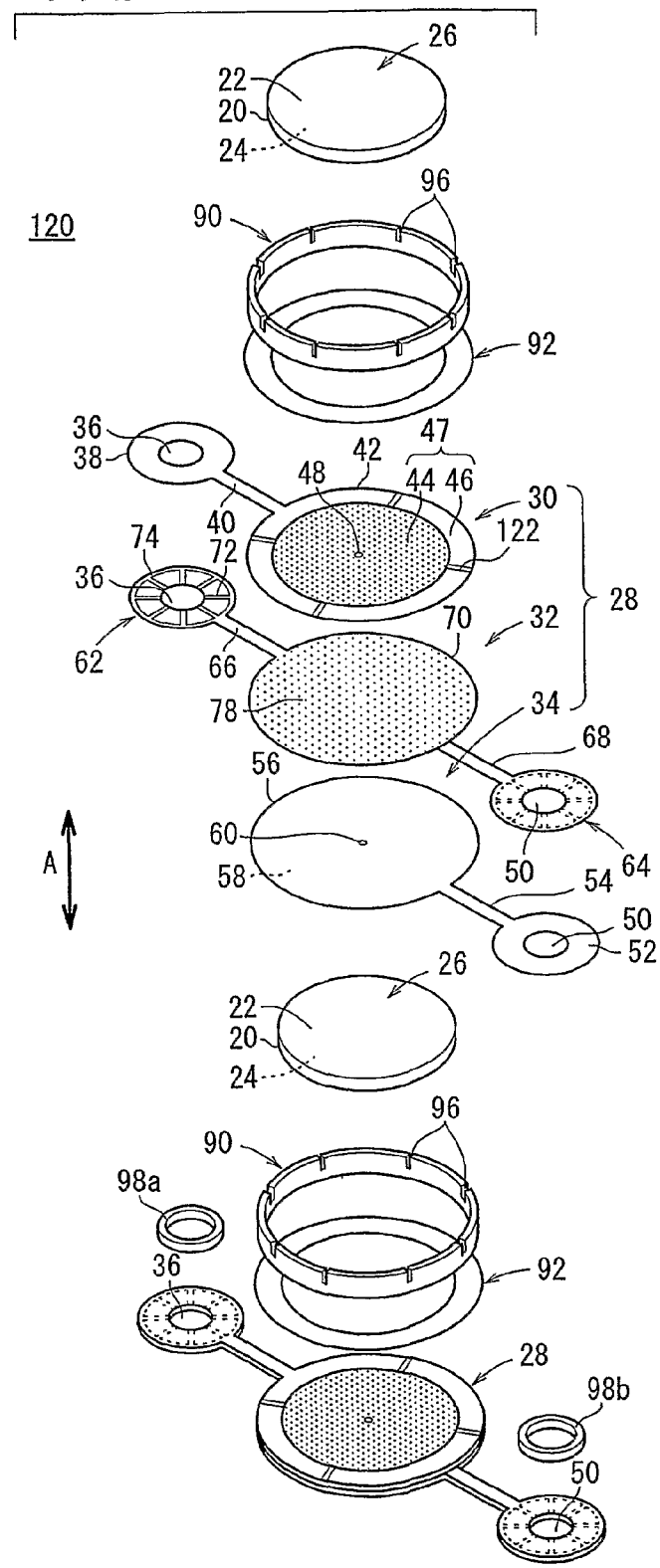
FIG. 7 is an exploded perspective view showing a fuel cell according to a second embodiment of the present invention.
Figure 8:
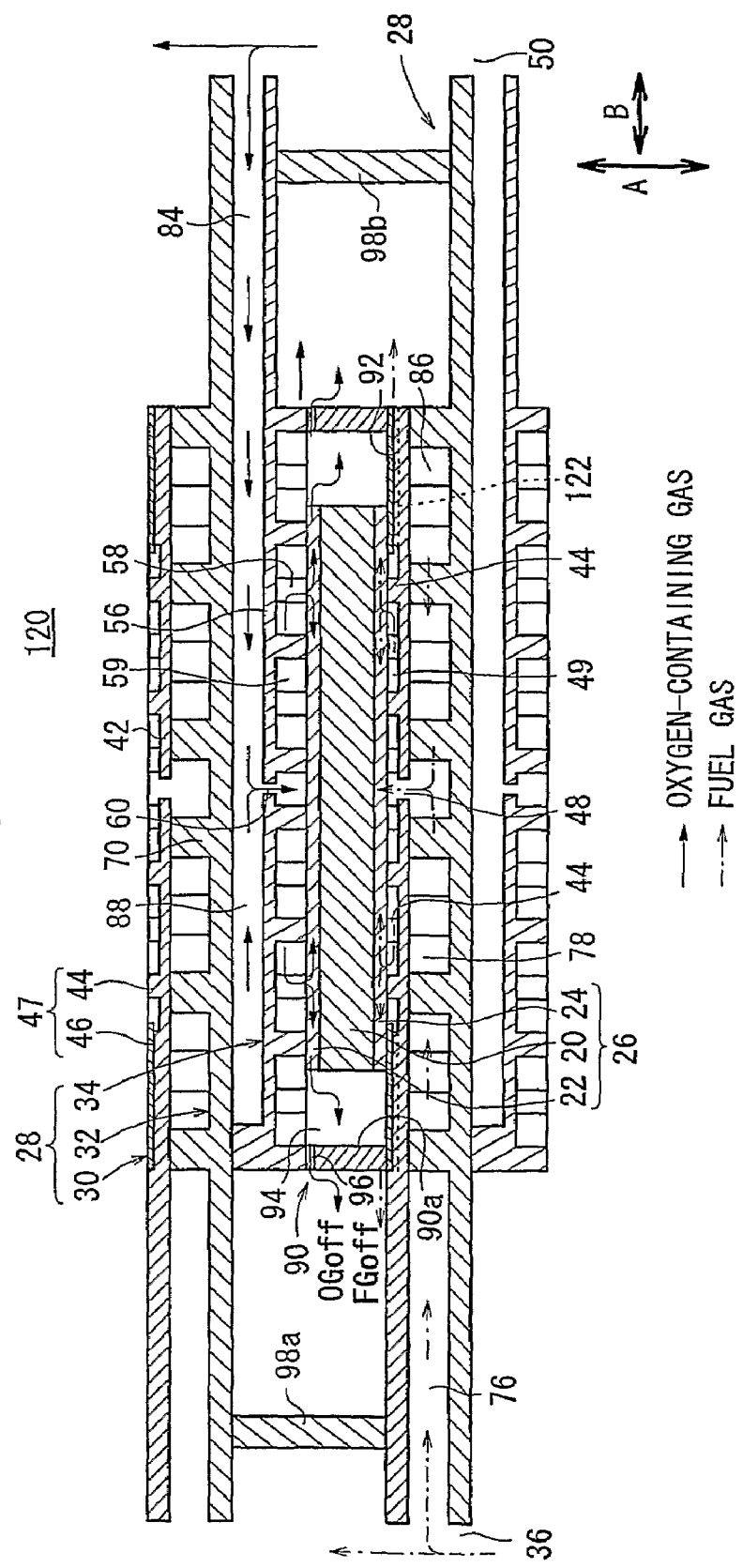
FIG. 8 is a cross-sectional view schematically showing operation of the fuel cell.

FIG. 7 is an exploded perspective view showing a fuel cell 120 according to a second embodiment of the present invention. FIG. 8 is a cross-sectional view schematically showing operation of the fuel cell 120.

The constituent elements that are identical to those of the fuel cell 10 according to the first embodiment are labeled with the same reference numeral, and description thereof will be omitted. Further, in third to seventh embodiments as described later, the constituent elements that are identical to those of the fuel cell 10 according to the first embodiment are labeled with the same reference numeral, and description thereof will be omitted.

In the fuel cell 120, conversely to the case of the first embodiment, the annular member 90 is provided on the ring foil 92. The inner end of the ring foil 92 is tightly interposed between the first plate 30 of the separator 28 and the outer end of the anode 24 of the electrolyte electrode assembly 26, and the outer end of the ring foil 92 is tightly interposed between the annular member 90 and the first plate 30.

The first plate 30 has grooves 122 for discharging the off gas from a space between the ring foil 92 and the grooves 122. The grooves 96 of the annular member 90 are provided on the outer end of the third plate 34 of the separator 28. The chamber 94 is open to the outside through the grooves 96.

The electrolyte electrode assembly 26 includes the electrolyte 20 having a thickness considerably large in comparison with the thickness of the cathode 22 and the thickness of the anode 24. Densification treatment is applied to the outer circumferential surface of the anode 24 for preventing leakage of the fuel gas.

In the second embodiment, after consumption at the cathode 22, the second exhaust gas OGoff flows into the chamber 94 from the outer circumferential end surface of the cathode 22, and flows through the grooves 96 of the annular member 90 to the outside of the fuel cell 120. Further, after consumption at the anode 24, the first exhaust gas FGoff flows through a space between the ring foil 92 and the first plate 30 to the outside of the fuel cell 120.

Thus, the first exhaust gas FGoff does not enter the chamber 94. It is possible to prevent combustion of the first exhaust gas FGoff and the second exhaust gas OGoff as much as possible. Accordingly, the same advantages as in the case of the first embodiment can be achieved. For example, it is possible to improve the power generation efficiency and the durability of the electrolyte electrode assembly 26.

Figure 9:
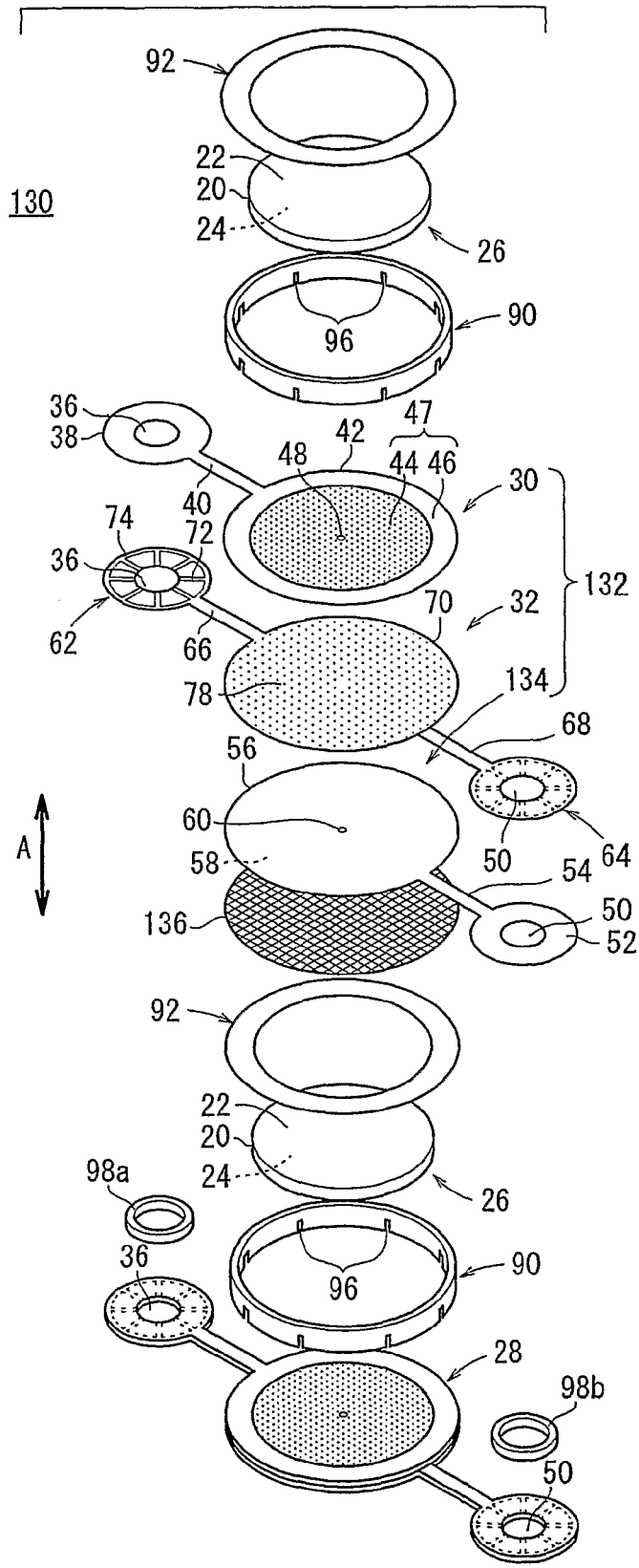
FIG. 9 is an exploded perspective view showing a fuel cell according to a third embodiment of the present invention.
Figure 10:
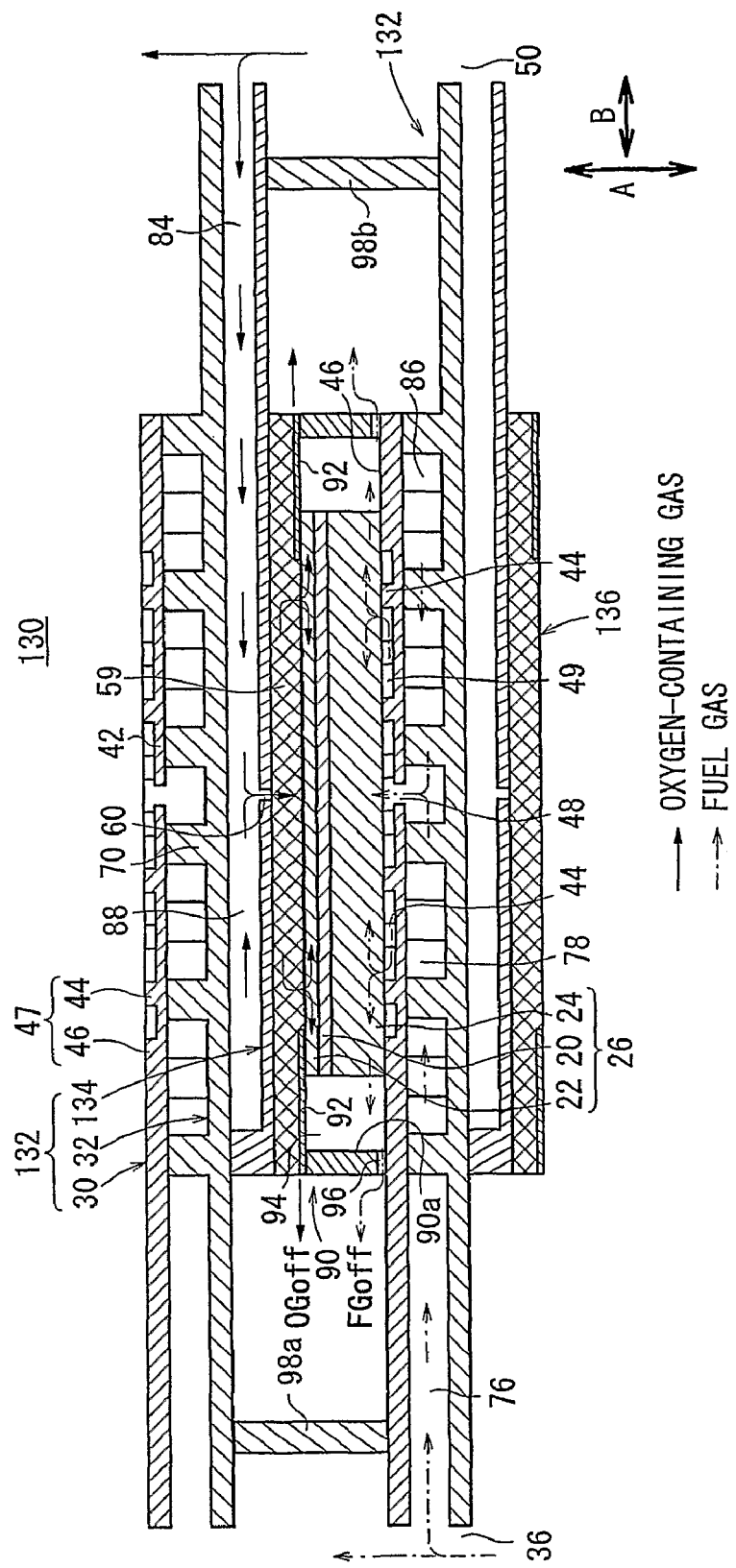
FIG. 10 is a cross-sectional view schematically showing operation of the fuel cell.

FIG. 9 is an exploded perspective view showing a fuel cell 130 according to a third embodiment of the present invention. FIG. 10 is a cross-sectional view schematically showing operation of the fuel cell 130.

The fuel cell 130 is formed by sandwiching the electrolyte electrode assembly 26 between a pair of separators 132. The separator 132 includes first, second, and third plates 30, 32, 134. The third plate 134 has an electrically conductive mesh member 136 on a surface facing the cathode 22. For example, the mesh member 136 is made of wire rod of stainless steel (SUS material) or the like, and has a circular shape.

The thickness of the mesh member 136 is determined such that the mesh member 136 is deformed desirably when a load in the stacking direction is applied to the mesh member 136. The mesh member 136 directly contacts the surface of the second circular disk 56 and the oxygen-containing gas channel 59 is formed in the mesh member 136.

In the third embodiment, as shown in FIG. 10, the oxygen-containing gas supplied to the oxygen-containing gas channel 59 formed in the mesh member 136 is consumed in the reaction, and then, the oxygen-containing gas after consumption is discharged to the outside of the fuel cell 130 through the mesh member 136. At this time, the ring foil 92 is provided as a shield between the mesh member 136 and the chamber 94. Therefore, the second exhaust gas OGoff does not flow into the chamber 94. Thus, combustion in the chamber 94 is prevented suitably. As a result, the same advantages as in the cases of the first and second embodiments can be obtained.

Figure 11:
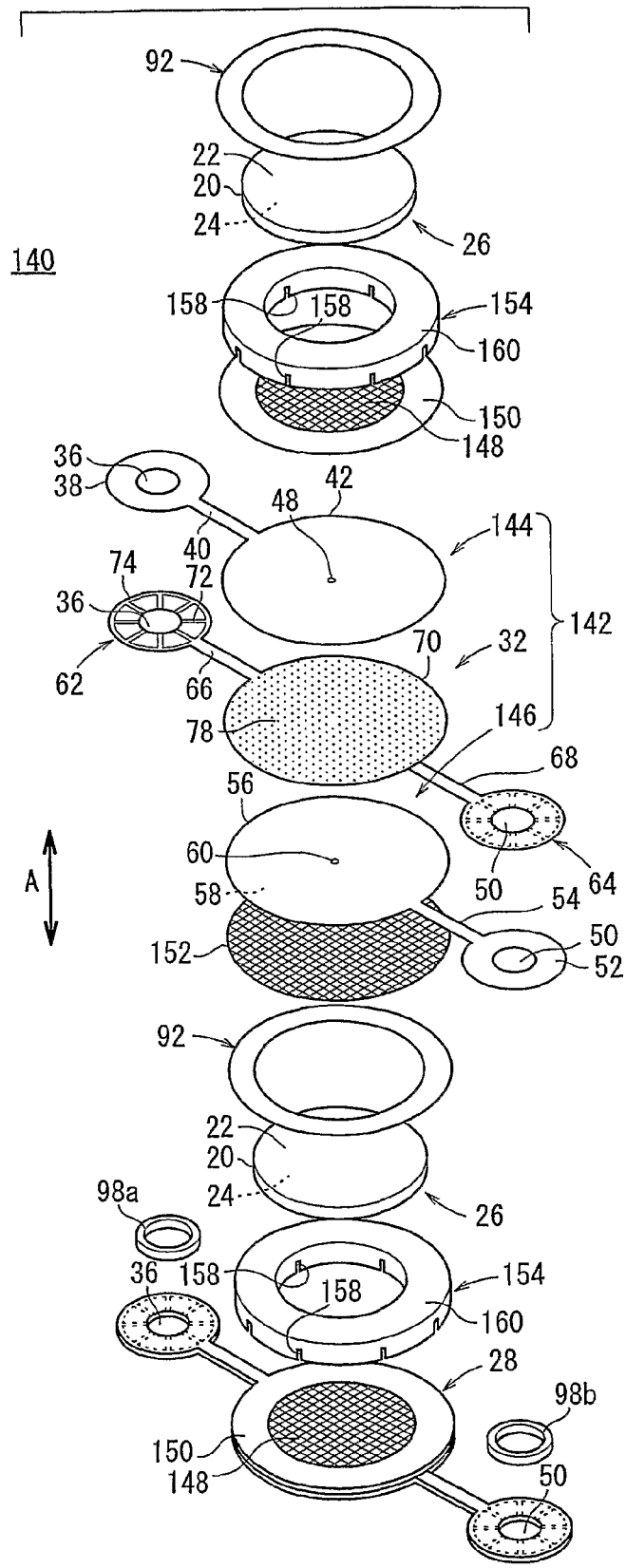
FIG. 11 is an exploded perspective view showing a fuel cell according to a fourth embodiment of the present invention.
Figure 12:
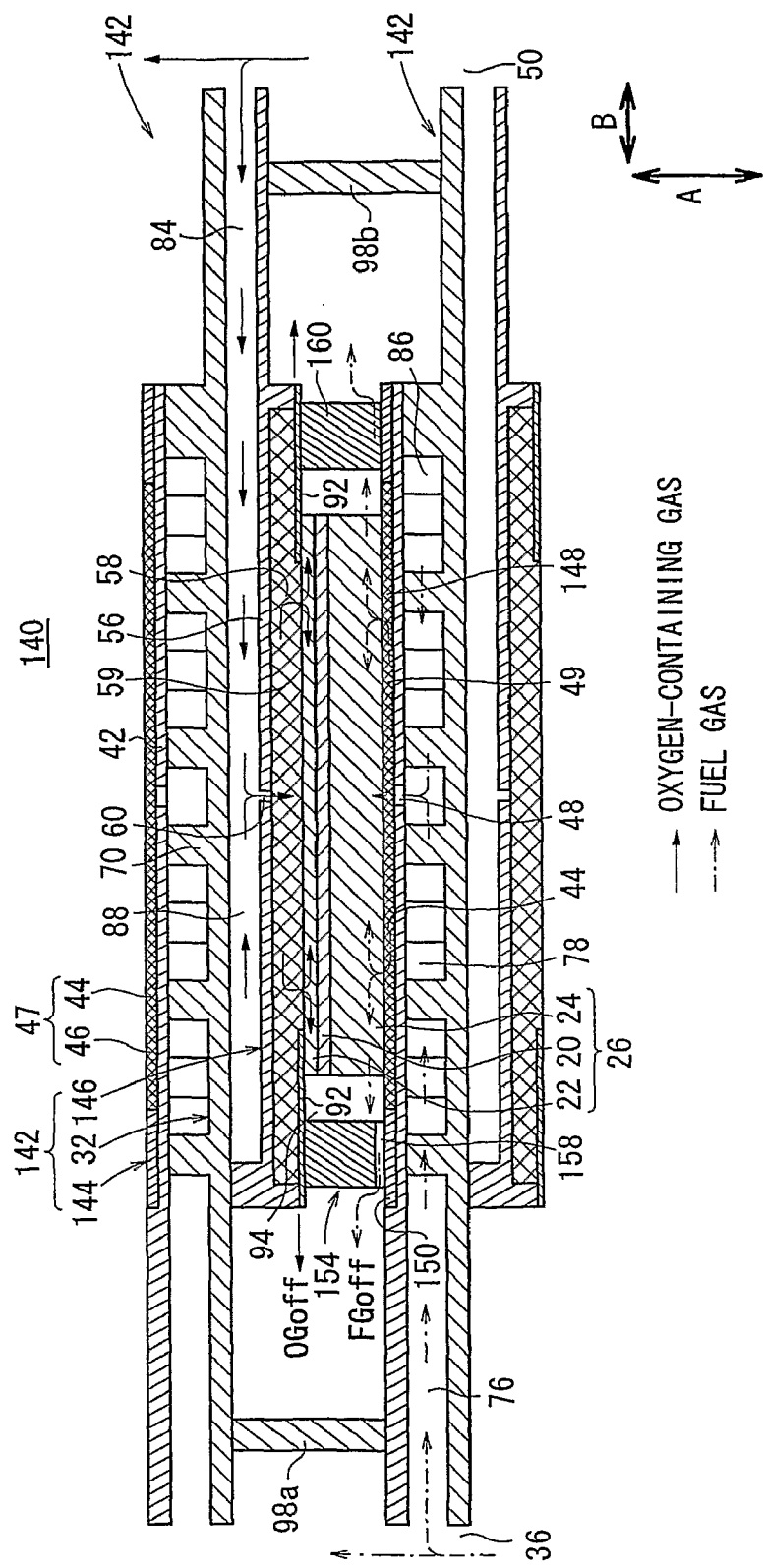
FIG. 12 is a cross-sectional view schematically showing operation of the fuel cell.

FIG. 11 is an exploded perspective view showing a fuel cell 140 according to a fourth embodiment of the present invention. FIG. 12 is a cross-sectional view showing operation of the fuel cell 140.

The fuel cell 140 is formed by sandwiching the electrolyte electrode assembly 26 between a pair of separators 142. The separator 142 includes first, second, and third plates 144, 32, 146. A first mesh member 148 and a ring portion 150 which is integral with the first mesh member 148 are provided on a surface of the first plate 144 facing the anode 24, and a second mesh member 152 is provided on a surface of the third plate 146 facing the cathode 22.

Each of the first and second mesh members 148, 152 has a circular disk shape, and made of a wire rod material of stainless steel (SUS material) or the like. The fuel gas channel 49 is formed in the first mesh member 148, and the oxygen-containing gas channel 59 is formed in the second mesh member 152. The annular member 154 and the ring foil 92 are provided between the separators 142.

For example, the annular member 154 is formed by providing ceramic coating on nickel (metal), and a plurality of grooves 158 are formed at predetermined intervals. The annular member 154 is provided on the first circular disk 42 of the first plate 144, corresponding to the ring portion 150. The ring foil 92 is placed on the annular member 154.

In the fourth embodiment, after consumption at the anode 24, the fuel gas flows as the first exhaust gas FGoff from the first mesh member 148 to the chamber 94, and then, the fuel gas flows through the grooves 158 of the annular member 154, and is discharged to the outside of the fuel cell 140. After consumption at the cathode 22, the oxygen-containing gas flows as the second exhaust gas OGoff through the second mesh member 152, and is discharged to the outside of the fuel cell 140. At this time, leakage of the second exhaust gas OGoff to the chamber 94 is prevented by the ring foil 92. Thus, combustion in the chamber 94 is prevented as much as possible.

Figure 13:
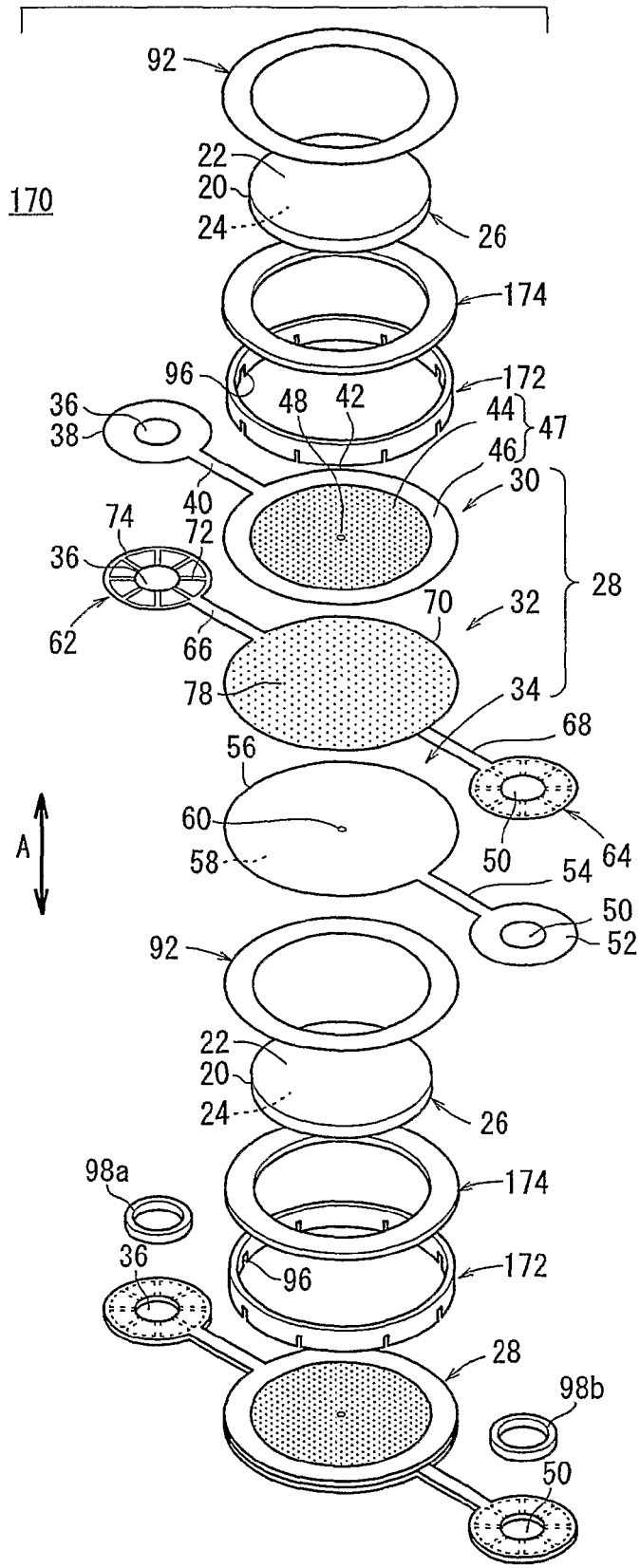
FIG. 13 is an exploded perspective view showing a fuel cell according to a fifth embodiment of the present invention.
Figure 14:
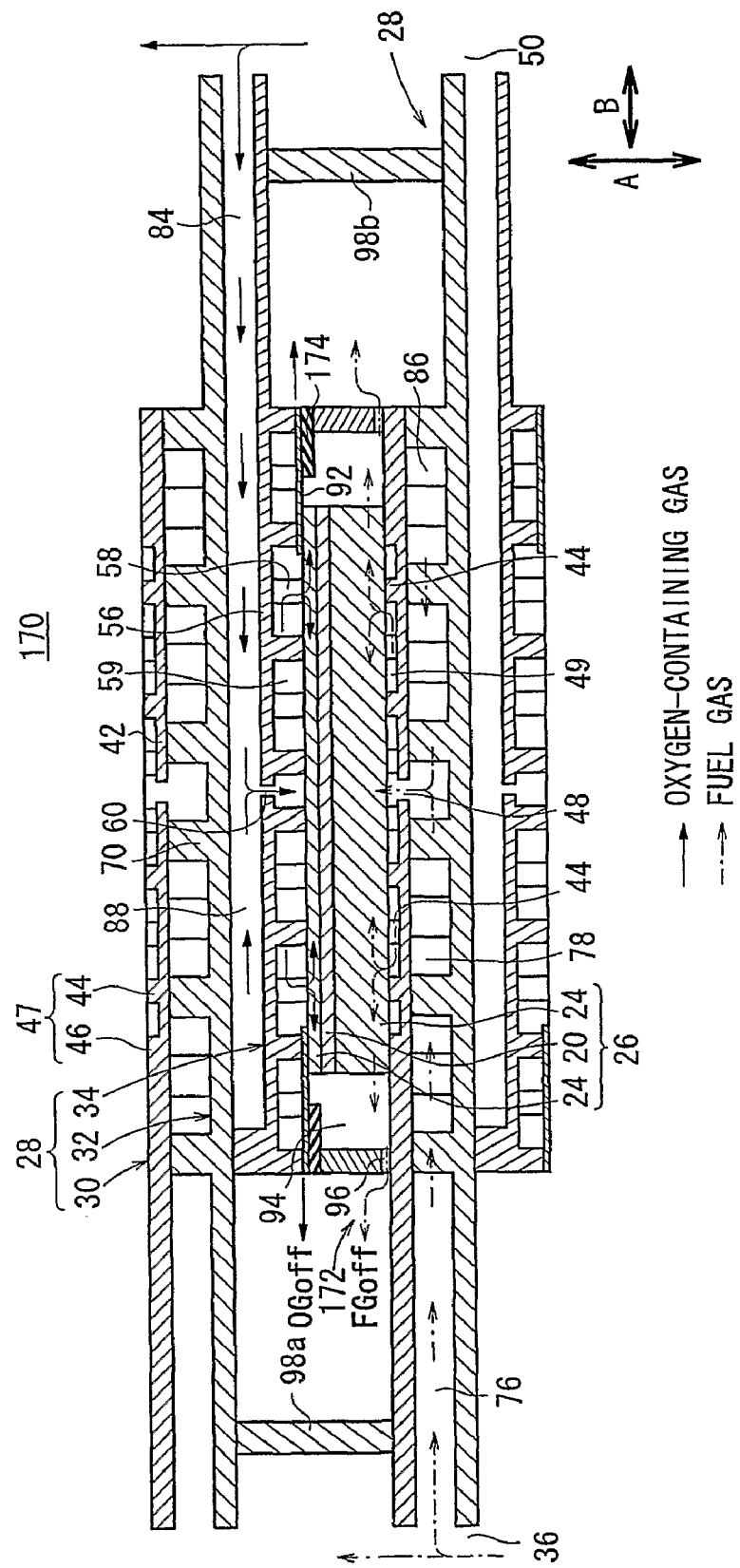
FIG. 14 is a cross-sectional view schematically showing operation of the fuel cell.

FIG. 13 is an exploded perspective view showing a fuel cell 170 according to a fifth embodiment of the present invention. FIG. 14 is a cross-sectional view schematically showing operation of the fuel cell 170.

An annular member 172, an insulating ring 174, and a ring foil 92 are provided between the separators 28. For example, the annular member 172 is made of nickel and the insulating ring 174 is made of mica material or the like. The annular member 172 is electrically insulated from the ring foil 92.

In the fifth embodiment, the annular member 172, the insulating ring 174, and the ring foil 92 are provided between the stacked separators 28. Thus, electrical insulation between the separators 28 can be performed reliably.

Figure 15:
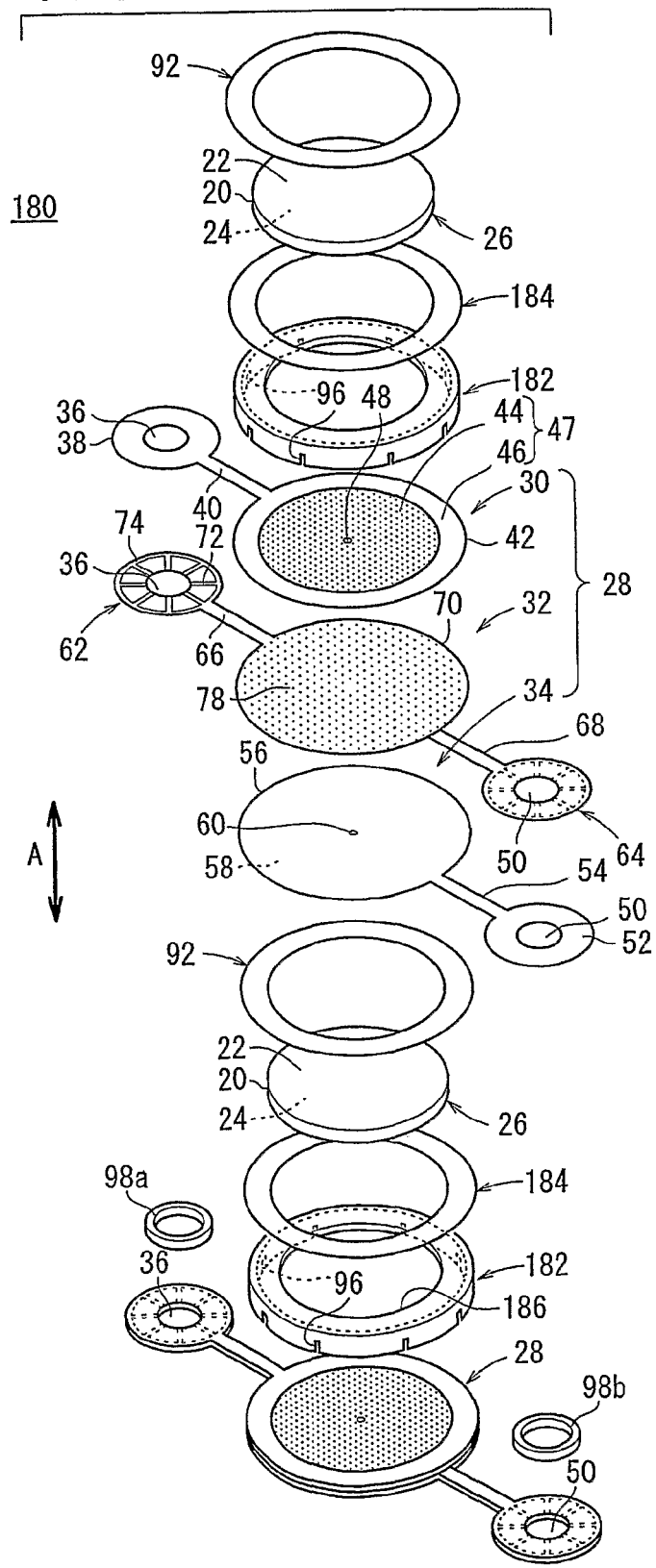
FIG. 15 is an exploded perspective view schematically showing a fuel cell according to a sixth embodiment of the present invention.
Figure 16:
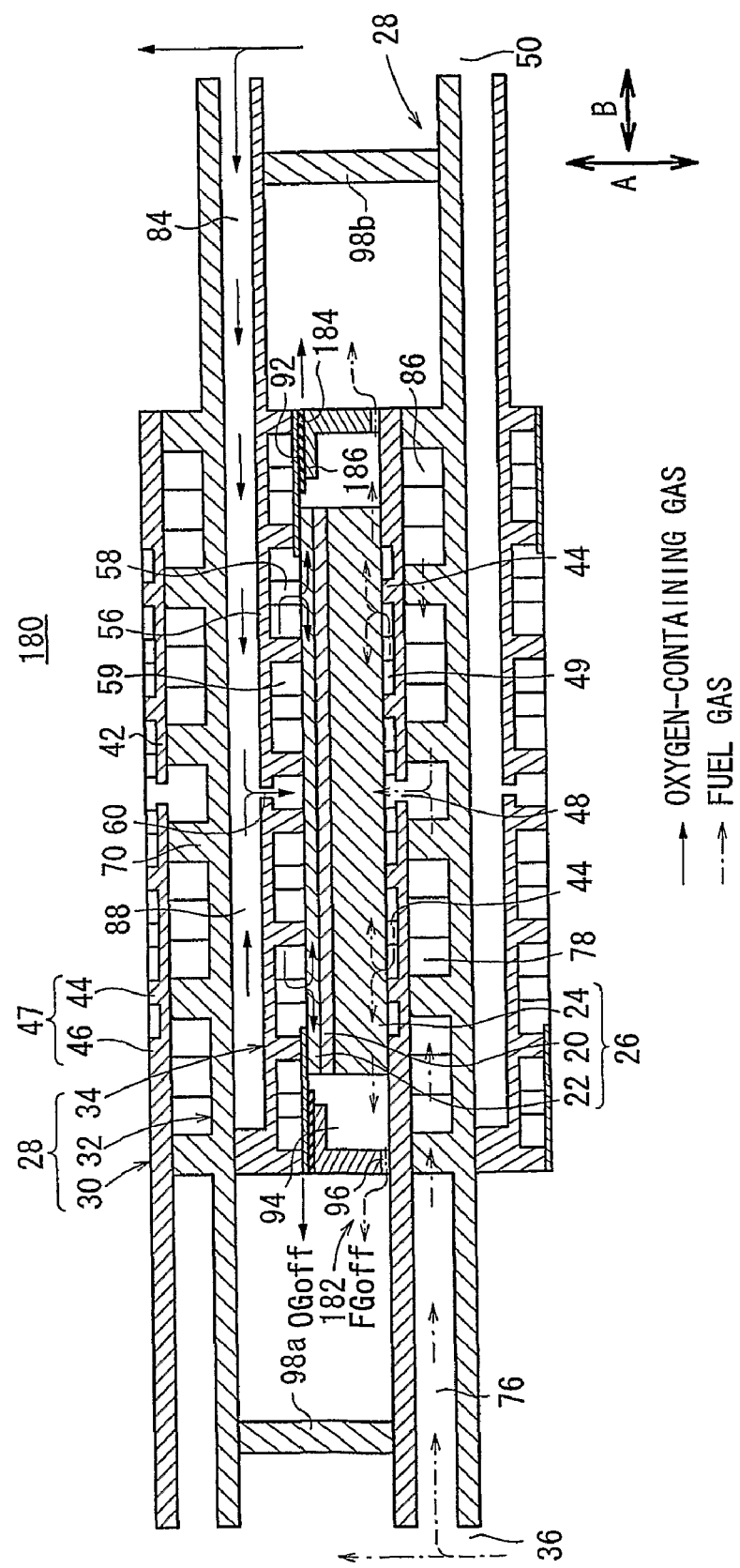
FIG. 16 is a cross-sectional view schematically showing operation of the fuel cell.

FIG. 15 is an exploded perspective view showing a fuel cell 180 according to a sixth embodiment of the present invention. FIG. 16 is a cross-sectional view schematically showing operation of the fuel cell 180.

In the fuel cell 180, an annular member 182, an insulating ring 184, and a ring foil 92 are provided between the separators 28. For example, the annular member 182 is made of nickel, and has an inner flange 186 protruding inwardly. The insulating ring 184 is relatively thin, and placed on the inner flange 186. Further, the ring foil 92 is placed on the insulating ring 184.

In the structure, the annular member 182 suitably presses the thin insulating ring 184 against the ring foil 92, and further improvement in electrical insulation is achieved advantageously.

Figure 17:
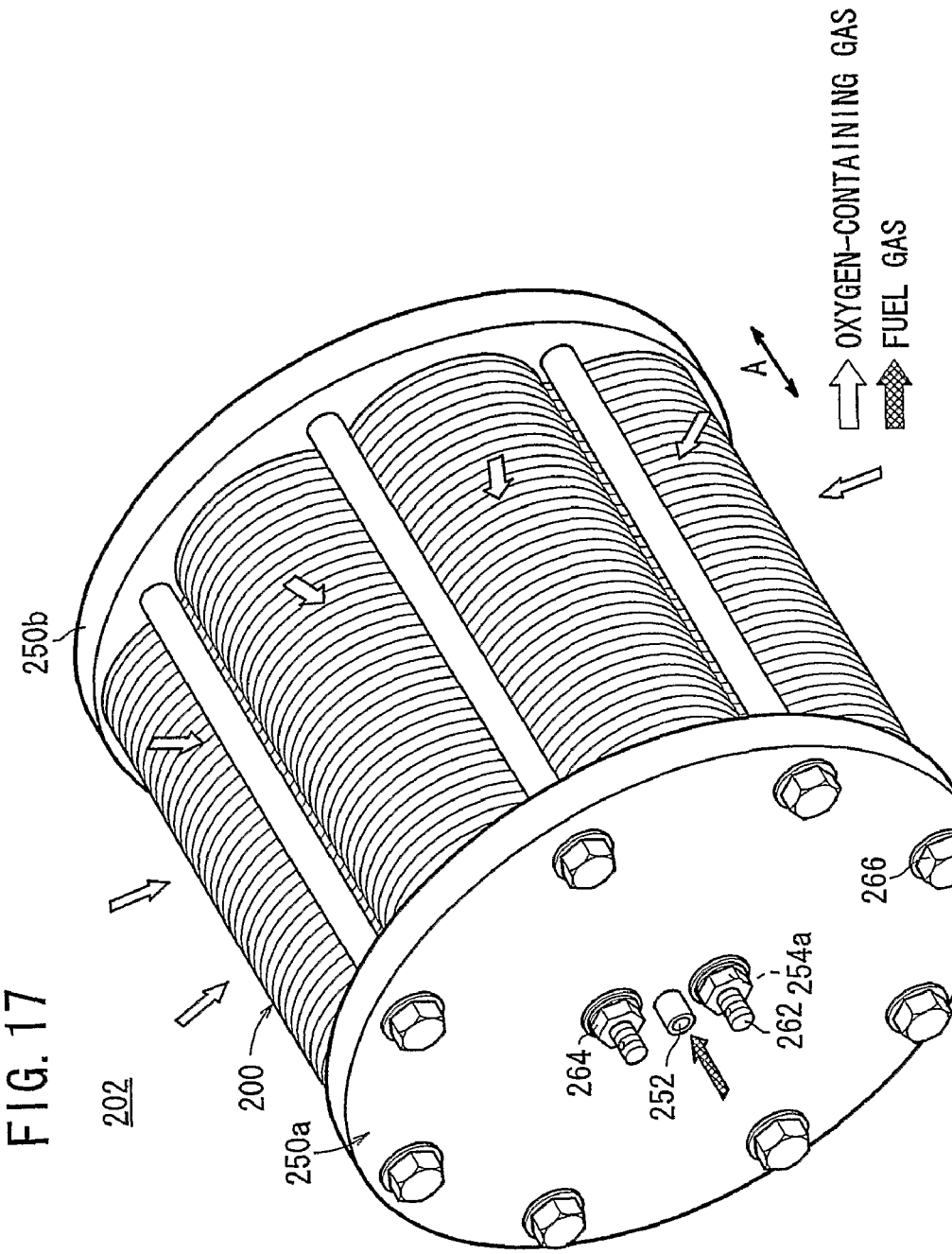
FIG. 17 is a perspective view schematically showing a fuel cell stack formed by stacking fuel cells according to a seventh embodiment of the present invention.

FIG. 17 is a schematic perspective view showing a fuel cell stack 202 formed by stacking fuel cells 200 according to a seventh embodiment of the present invention.

Figure 18:
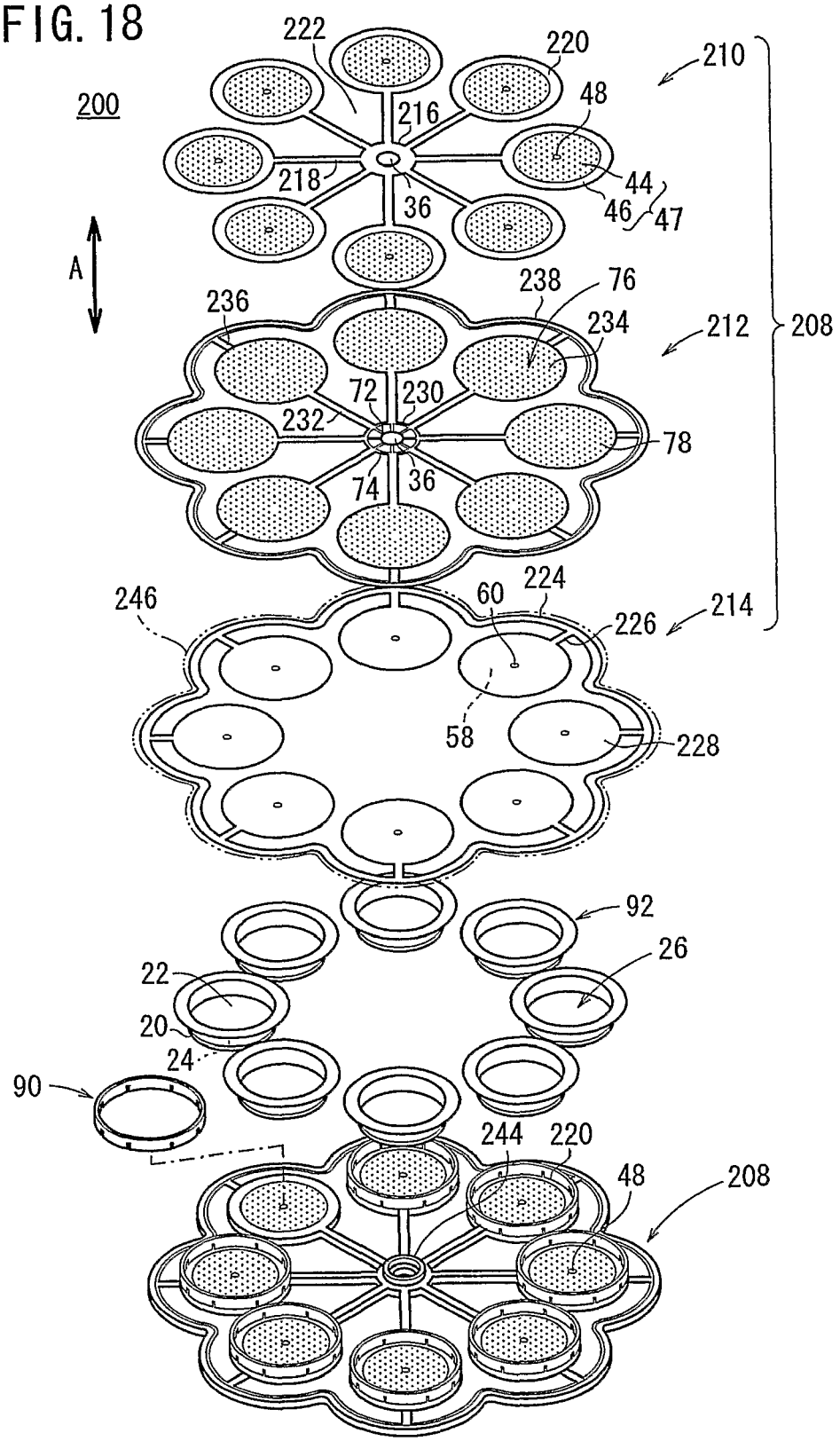
FIG. 18 is an exploded perspective view showing a separator of the fuel cell.
Figure 19:
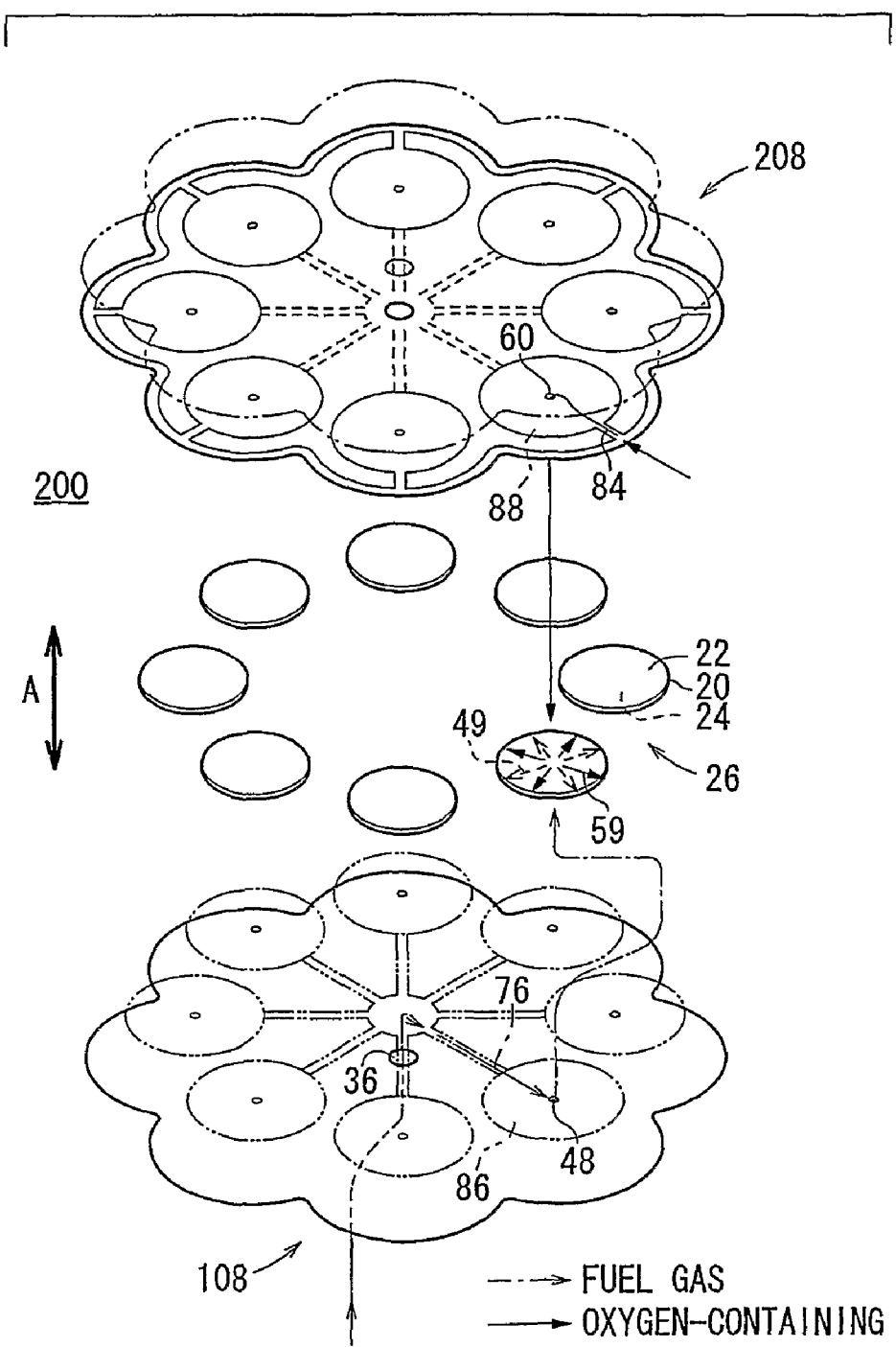
FIG. 19 is a partial exploded perspective view showing gas flows in the fuel cell.

As shown in FIGS. 18 and 19, the fuel cell 200 is formed by sandwiching a plurality of, e.g., eight electrolyte electrode assemblies 26 between a pair of separators 208. The eight electrolyte electrode assemblies 26 are arranged along a virtual circle concentric with a fuel gas supply passage 36 extending through the center of the separators 208.

The separator 208 includes first, second, and third plates 210, 212, 214 that are stacked together. For example, the first to third plates 210, 212, 214 are metal plates of, e.g., stainless alloy.

The first plate 210 has a first small diameter end portion 216. A fuel gas supply passage 36 extends through the center of the first small diameter end portion 216. Further, the first plate 210 includes first circular disks 220 each having a relatively large diameter. The first small diameter end portion 216 is integral with the first circular disks 220 through a plurality of bridges 218. The bridges 218 extend radially outwardly from the first small diameter end portion 216 at equal intervals (angles). Further, an exhaust gas channel 222 is formed in the area around, and internal from the first circular disks 220.

Each of the first circular disks 220 has first protrusions 47 on a surface which contacts the anode 24 of the electrolyte electrode assembly 26. The first protrusions 47 include a plurality of protrusions 44 and a ring shaped protrusion 46. A fuel gas inlet 48 is formed at the center of the first circular disk 220. The fuel gas inlet 48 is connected to the fuel gas channel 49.

The third plate 214 has a curved outer section 224. Respective circular arc portions of the curved outer section 224 are integral with second circular disks 228 each having a relatively large diameter through bridges 226 extending internally from the circular arc portions. As in the case of the first circular disks 220 of the first plate 210, eight second circular disks 228 are arranged at equal intervals (angles). Each of the second circular disks 228 has a plurality of second protrusions 58 on a surface which contacts the cathode 22 of the electrolyte electrode assembly 26. An oxygen-containing gas inlet 60 is formed at the center in each of the second circular disks 228. The oxygen-containing gas inlet 60 is connected to the oxygen-containing gas channel 59.

The second plate 212 has a second small diameter end portion 230. The fuel gas supply passage 36 extends through the center of the second small diameter end portion 230. Eight bridges 232 extend radially from the second small diameter end portion 230. Front ends of the bridges 232 are integral with third circular disks 234 each having a relatively large diameter. The third circular disks 234 are connected to bridges 236 along extension lines of the bridges 232. All of the bridges 236 are integral with the curved outer section 238.

A plurality of third protrusions 78 are formed in the entire surface of the third circular disk 234 facing the first plate 210. Slits 72 and a recess 74 are formed in the second small diameter end portion 230. Part of the fuel gas supply channel 76 is formed in the bridges 232.

Figure 20:
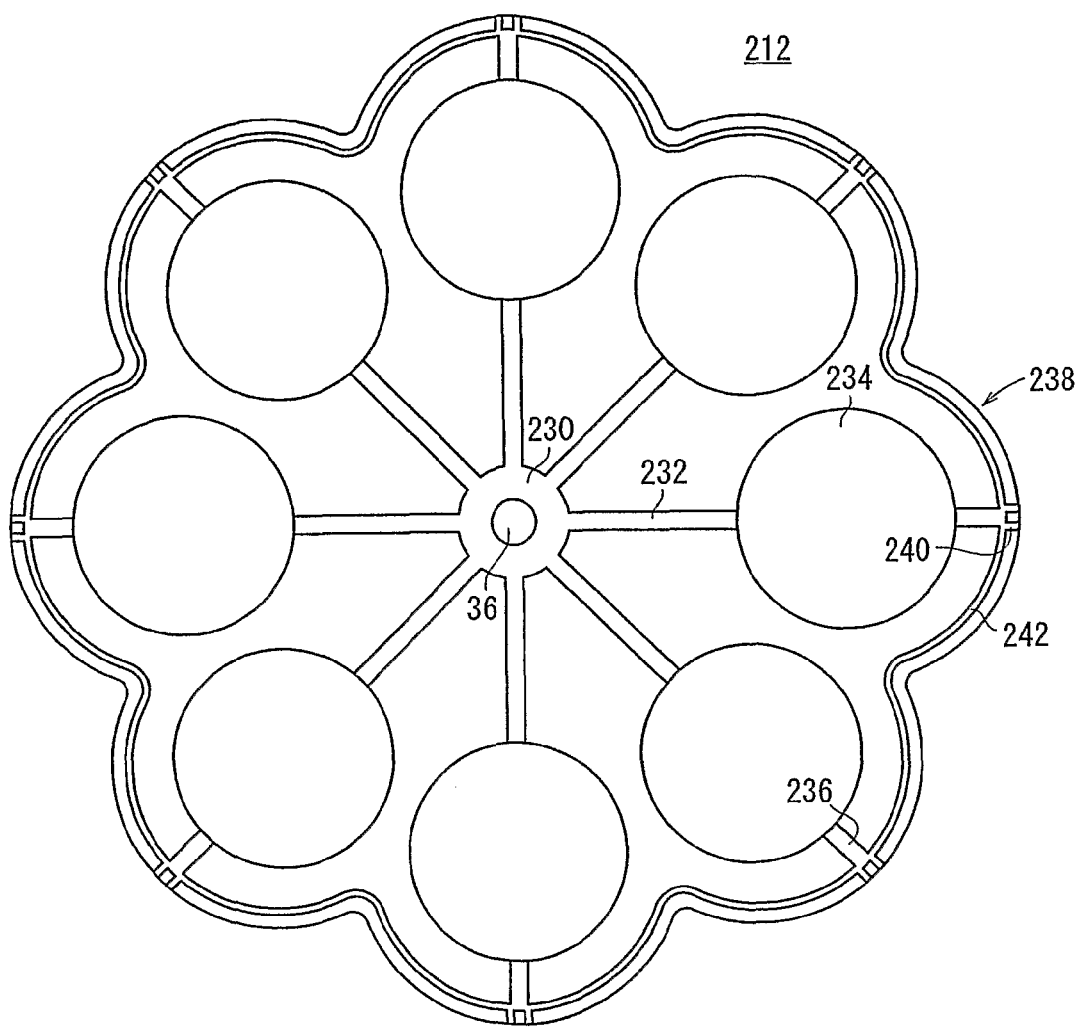
FIG. 20 is a view showing one surface of a second plate of the separator.

As shown in FIG. 20, the curved outer section 238 of the second plate 212 has a plurality slits 240 as air intake passages at positions corresponding to the respective third circular disks 234, on a surface facing the third plate 214. Further, a recess 242 for preventing the flow of brazing material is formed along the profile of the curved outer section 238.

When the bridge 218 of the first plate 210 and the bridge 232 of the second plate 212 are joined together by brazing to form a fuel gas channel member, part of the fuel gas supply channel 76 is formed in the fuel gas channel member. Further, the fuel gas supply channel 76 includes a fuel gas pressure chamber 86 between the first circular disk 220 and the third circular disk 234.

When the bridge 236 of the second plate 212 and the bridge 226 of the third plate 214 are joined together by brazing to form an oxygen-containing gas channel member, part of the oxygen-containing gas supply channel 84 is formed in the oxygen-containing gas channel member. Further, the oxygen-containing gas supply channel 84 includes an oxygen-containing gas pressure chamber 88 between the second circular disk 228 and the third circular disk 234.

The annular member 90 is provided on the first circular disk 220 of each separator 208. The ring foil 92 is placed on the annular member 90 and the outer end of the cathode 22 of the electrolyte electrode assembly 26.

An insulating seal 244 for sealing the fuel gas supply passage 36 is provided between the separators 208. An insulating seal 246 is provided between the curved outer sections 224, 238. For example, the insulating seals 244, 246 are made of mica material, or ceramic material.

As shown in FIG. 17, the fuel cell stack 202 includes a plurality of fuel cells 200 stacked together, and end plates 250a, 250b provided at opposite ends in the stacking direction. The end plate 250a is insulated and a fuel gas supply port 252 is formed at the center of the end plate 250a. The fuel gas supply port 252 is connected to the fuel gas supply passage 36 in each of the fuel cells 200. Components between the end plates 250a, 250b are tightened together in the stacking direction using bolts 266.

Next, operation of the fuel cell stack 202 will be described below.

As shown in FIG. 18, in assembling the fuel cell 200, firstly, the first plate 210 and the third plate 214 are joined to both surfaces of the second plate 212 of the separator 208, e.g., by brazing. Further, the ring shaped insulating seal 244 is provided on the first plate 210 or the third plate 214 around the fuel gas supply passage 36. Further, the curved insulating seal 246 is provided on the curved outer section 238 of the second plate 212 or the curved outer section 224 of the third plate 214.

Figure 21:
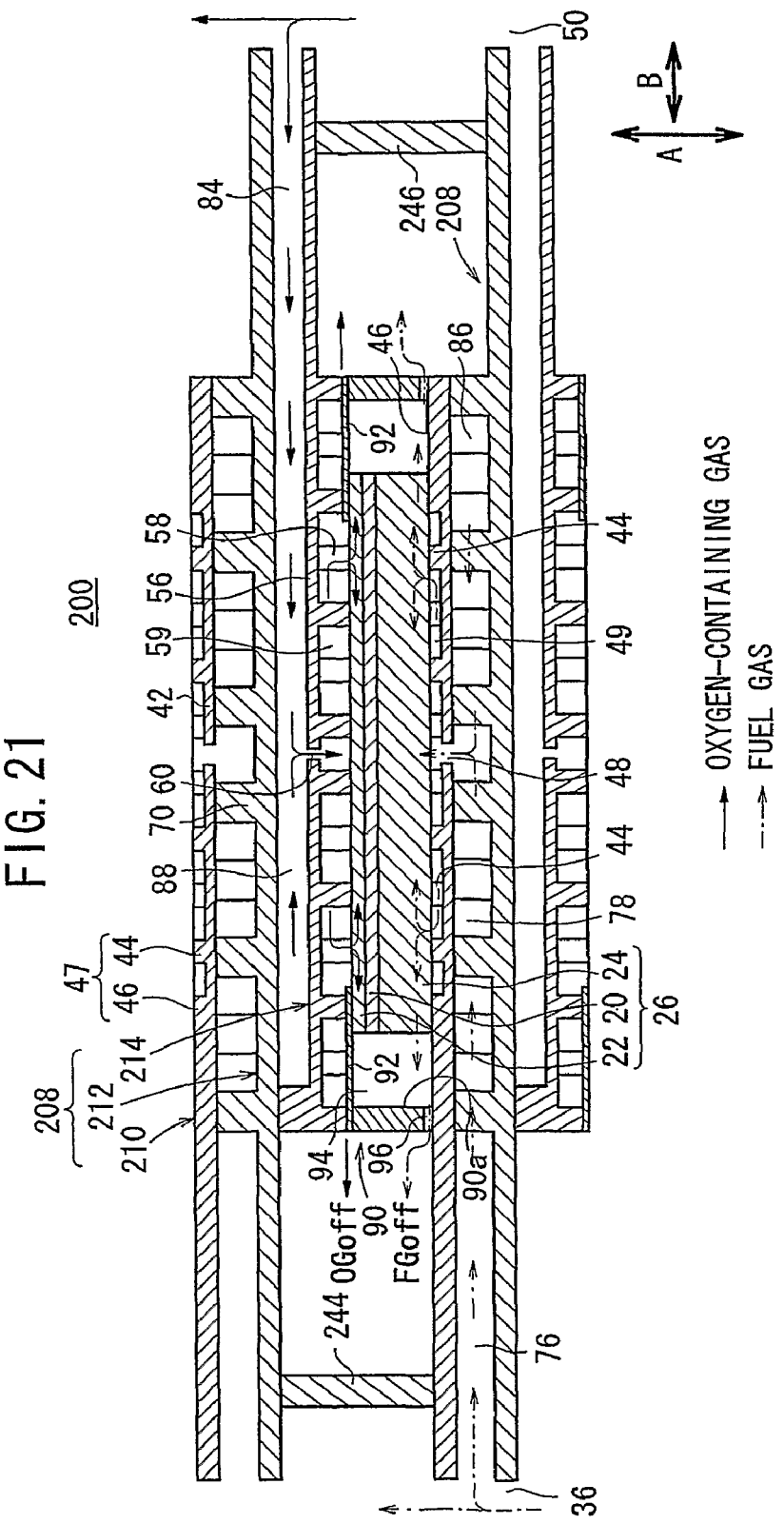
FIG. 21 is a cross-sectional view schematically showing operation of the fuel cell.
Figure 22:
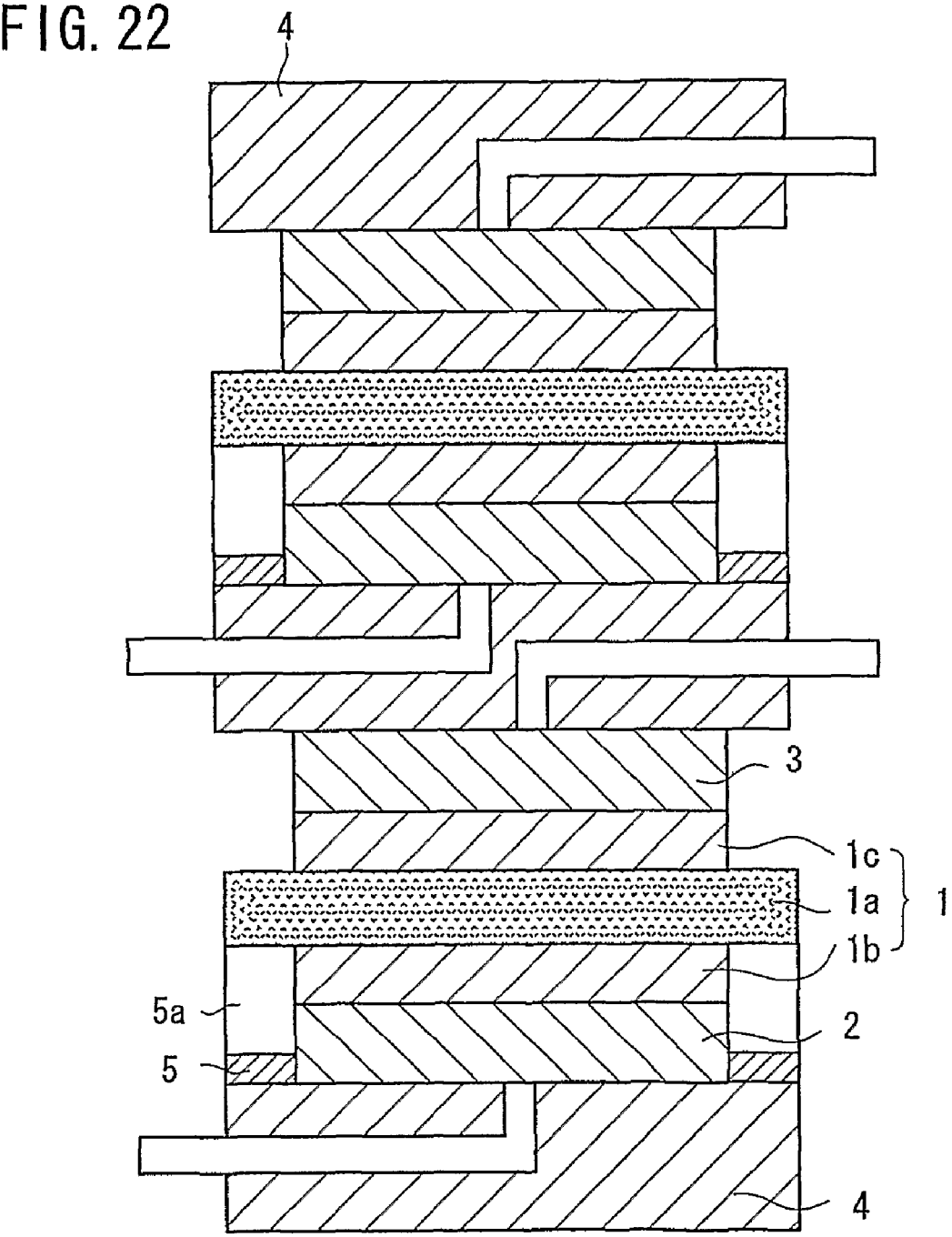
FIG. 22 is a cross-sectional view showing a conventional solid oxide fuel cell.

In this manner, the separator 208 is fabricated. As shown in FIG. 21, the second plate 212 divides a space between the first and third plates 210, 214 to form the fuel gas supply channel 76 and the oxygen-containing gas supply channel 84. Further, the fuel gas supply channel 76 is connected to the fuel gas supply passage 36, and the oxygen-containing gas supply channel 84 is open to the outside through the slits 240. Thus, the oxygen-containing gas is supplied from the outside of the fuel cell stack 202.

Then, the eight electrolyte electrode assembles 26 are sandwiched between the separators 208. As shown in FIG. 18, the electrolyte electrode assemblies 26 are placed between the separators 208, i.e., between the first circular disks 220 of one separator 208 and the second circular disks 228 of the other separator 208. The fuel gas inlet 48 is positioned at the center in each of the anodes 24, and the oxygen-containing gas inlet 60 is positioned at the center in each of the cathodes 22.

The annular member 90 is provided on the first circular disk 220 of each separator 208 and the ring foil 92 is placed on the annular member 90 and the outer end of the cathode 22 of the electrolyte electrode assembly 26.

The fuel cells 200 as assembled as mentioned above are stacked in the direction indicated by the arrow A, and tightened together between the end plates 250a, 250b to form the fuel cell stack 202 (see FIG. 17).

When the fuel gas is supplied to the fuel gas supply passage 36 of the fuel cell stack 202, the fuel gas flows in the stacking direction indicated by the arrow A, and flows into the fuel gas supply channel 76 of the separators 208 of each fuel cell 200 (see FIG. 21).

When the fuel gas is supplied to the fuel gas pressure chamber 86 of the fuel gas supply channel 76, the fuel gas flows into the narrow fuel gas inlet 48, and the internal pressure of the fuel gas in the fuel gas pressure chamber 86 is increased. Thus, the fuel gas is supplied from the fuel gas inlet 48 to the fuel gas channel 49. The fuel gas flows inside the fuel gas channel 49 from the central region to the outer circumferential region of the anode 24.

The oxygen-containing gas is supplied into the outer circumferential side of each fuel cell 200. The oxygen-containing gas is supplied to the oxygen-containing gas supply channel 84 through the slits 240 formed in the outer circumferential portion of each separator 208. The oxygen-containing gas supplied to the oxygen-containing gas supply channel 84 flows into the narrow oxygen-containing gas inlet 60, and the internal pressure of the oxygen-containing gas in the oxygen-containing gas pressure chamber 88 is increased. Thus, the oxygen-containing gas is supplied from the oxygen-containing gas inlet 60 to the oxygen-containing gas channel 59. The oxygen-containing gas flows inside the oxygen-containing gas channel 59 from the central region to the outer circumferential region of the cathode 22.

Thus, in the electrolyte electrode assembly 26, the fuel gas flows from the central region to the outer circumferential region of the anode 24, and the oxygen-containing gas flows from the central region to the outer circumferential region of the cathode 22 (see FIG. 21). At this time, oxygen ions flow through the electrolyte 20 toward the anode 24 for generating electricity by electrochemical reactions.

In the seventh embodiment, the same advantages as in the cases of the first to sixth embodiments can be obtained.

The invention claimed is:

1. A fuel cell formed by stacking an electrolyte electrode assembly and separators, said electrolyte electrode assembly including an anode, a cathode, and an electrolyte interposed between said anode and said cathode, said fuel cell comprising:
a seal member extending from a position between an outer end of said electrolyte electrode assembly and said separator to an outer circumference of said separator, wherein
said seal member prevents a first exhaust gas which has been consumed at one electrode of said anode and said cathode from entering another electrode of said anode and said cathode, and allows a second exhaust gas which has been consumed at the other electrode to be discharged to outside of said electrolyte electrode assembly, and
said separator comprises a fuel gas channel for supplying a fuel gas from a central region to an outer circumferential region on a surface of said anode and further comprises an oxygen-containing gas channel for supplying an oxygen-containing gas from a central region to an outer circumferential region on a surface of said cathode.

2. A fuel cell according to claim 1, wherein said seal member is provided adjacent to the other electrode, and an annular member having an opening for discharging the first exhaust gas which has been consumed at the one electrode to the outside of said electrolyte electrode assembly is provided between said separators.

3. A fuel cell according to claim 1, wherein said separator includes first, second, and third plates which are stacked together; and
said fuel gas channel is formed between said first plate and said anode, and said oxygen-containing gas channel is formed between said third plate and said cathode.

4. A fuel cell according to claim 3, wherein a fuel gas pressure chamber which can be filled with the fuel gas under pressure, and a fuel gas inlet connecting said fuel gas pressure chamber and said fuel gas channel at a position corresponding to the central region of a surface of said anode are formed between said first plate and said second plate; and
an oxygen-containing gas pressure chamber which can be filled with the oxygen-containing gas under pressure, and an oxygen-containing gas inlet connecting said oxygen-containing gas pressure chamber and said oxygen-containing gas channel at a position corresponding to the central region of a surface of said cathode are formed between said second plate and said third plate.

5. A fuel cell according to claim 1, wherein said annular member is spaced from an outer circumferential surface of said electrolyte electrode assembly, and provided around said electrolyte electrode assembly to form a chamber where the first exhaust gas can be retained between an inner surface of said annular member and the outer surface of said electrolyte electrode assembly.

6. A fuel cell according to claim 5, wherein said annular member is an insulating member.

7. A fuel cell according to claim 6, wherein said insulating member is an insulator, a metal member including an insulating layer, or a composite member of insulator and metal.

8. A fuel cell according to claim 5, wherein insulator is provided between said annular member and said separator, or between said annular member and said seal member.

9. A fuel cell according to claim 5, wherein said seal member is a metal foil ring member.

10. A fuel cell according to claim 9, wherein an insulating layer is provided in part of said metal foil ring member.

11. A fuel cell according to claim 10, wherein said insulating layer contacts any one of said electrolyte, said anode, and said cathode.

12. A fuel cell formed by stacking an electrolyte electrode assembly and separators, said electrolyte electrode assembly including an anode, a cathode, and an electrolyte interposed between said anode and said cathode, said fuel cell comprising:
an annular member provided between said separators around an outer circumferential portion of said electrolyte electrode assembly, said annular member having an opening for discharging a first exhaust gas which has been consumed at one electrode of said anode and said cathode to outside of said electrolyte electrode assembly;
a seal member provided adjacent to another electrode of said anode and said cathode, said seal member extending from a position between an outer end of said electrolyte electrode assembly and said separator to a position between said annular member and said separator, wherein
said seal member prevents the first exhaust gas from entering the other electrode, and allows a second exhaust gas which has been consumed at the other electrode to be discharged to the outside of said electrolyte electrode assembly.

13. A fuel cell according to claim 12, wherein rigidity of said annular member is high in comparison with said seal member.

14. A fuel cell according to claim 12, wherein said separator comprises:
a fuel gas channel for supplying a fuel gas from a central region to an outer circumferential region on a surface of said anode; and
an oxygen-containing gas channel for supplying an oxygen-containing gas from a central region to an outer circumferential region on a surface of said cathode.

15. A fuel cell according to claim 14, wherein said separator includes first, second, and third plates which are stacked together; and
said fuel gas channel is formed between said first plate and said anode, and said oxygen-containing gas channel is formed between said third plate and said cathode.

16. A fuel cell according to claim 15, wherein a fuel gas pressure chamber which can be filled with the fuel gas under pressure, and a fuel gas inlet connecting said fuel gas pressure chamber and said fuel gas channel at a position corresponding to the central region of a surface of said anode are formed between said first plate and said second plate; and an oxygen-containing gas pressure chamber which can be filled with the oxygen-containing gas under pressure, and an oxygen-containing gas inlet connecting said oxygen-containing gas pressure chamber and said oxygen-containing gas channel at a position corresponding to the central region of a surface of said cathode are formed between said second plate and said third plate.

17. A fuel cell according to claim 14, wherein said annular member is spaced from an outer circumferential surface of said electrolyte electrode assembly, and proided around said electrolyte electrode assembly to form a chamber where the first exhaust gas can be retained between an inner surface of said annular member and the outer surface of said electrolyte electrode assembly.

18. A fuel cell according to claim 17, wherein said annular member is an insulating member.

19. A fuel cell according to claim 18, wherein said insulating member is an insulator, a metal member including an insulating layer, or a composite member of insulator and metal.

20. A fuel cell according to claim 17, wherein insulator is provided between said annular member and said separator, or between said annular member and said seal member.

21. A fuel cell according to claim 17, wherein said seal member is a metal foil ring member.

22. A fuel cell according to claim 21, wherein an insulating layer is provided in part of said metal foil ring member.

23. A fuel cell according to claim 22, wherein said insulating layer contacts any one of said electrolyte, said anode, and said cathode.

* * * * *